United States Patent [19]
Zicker et al.

[11] Patent Number: 5,046,082
[45] Date of Patent: Sep. 3, 1991

[54] REMOTE ACCESSING SYSTEM FOR CELLULAR TELEPHONES

[75] Inventors: Robert G. Zicker, Houston; John K. Dion, The Woodlands; Kevin B. Blair; William J. Austin, both of Spring, all of Tex.

[73] Assignee: GTE Mobile Communications Service Corporation, Houston, Tex.

[21] Appl. No.: 518,774

[22] Filed: May 2, 1990

[51] Int. Cl.$^5$ .................................. H04M 11/00
[52] U.S. Cl. ............................... 379/59; 379/63
[58] Field of Search ........................... 379/58-60, 379/63, 95, 196, 62, 199, 57

[56] References Cited

U.S. PATENT DOCUMENTS

| | | | |
|---|---|---|---|
| 4,310,720 | 1/1982 | Check, Jr. | 379/95 |
| 4,443,661 | 4/1984 | Kubo . | |
| 4,724,538 | 2/1988 | Farrell . | |
| 4,730,187 | 3/1988 | Menich et al. | 379/60 |
| 4,742,560 | 5/1988 | Arai | 379/62 |
| 4,775,999 | 10/1988 | Williams . | |
| 4,776,003 | 10/1988 | Harris . | |
| 4,777,646 | 10/1988 | Harris . | |
| 4,788,711 | 11/1988 | Nasco, Jr. . | |
| 4,817,126 | 3/1989 | Hendershot . | |
| 4,817,190 | 3/1989 | Comroe et al. . | |
| 4,825,457 | 4/1989 | Lebowitz . | |
| 4,831,647 | 5/1989 | D'Avello et al. . | |
| 4,860,336 | 8/1989 | D'Avello et al. | 379/63 |
| 4,860,341 | 8/1989 | D'Avello et al. . | |
| 4,893,335 | 1/1990 | Fuller et al. | 379/57 |
| 4,939,768 | 7/1990 | Inaba et al. | 379/63 |

Primary Examiner—Jin F. Ng
Assistant Examiner—Dwayne D. Bost
Attorney, Agent, or Firm—Lowell W. Gresham

[57] ABSTRACT

A system for allowing remote access to cellular telephone programming through the PSTN is disclosed. The system includes a specifically configured remotely accessible cellular telephone (RACT) and a host system for managing a multiplicity of such RACTs. The RACT of the present invention may be configured either as a cellular telephone itself, or as a kit which, when combined with a conventional cellular telephone, forms a RACT. The RACT includes a signal detection circuit configured to detect a unique identifying signal that the host system generates and is not commonly found in conventional data communication traffic. RACT programming includes conventional cellular processes so that remote accessibility features do not impact conventional operation of a cellular telephone. Moreover, RACT programming includes automated call origination and call answering processes which minimize the impact of the present invention on cellular customers and on the public cellular system. RACT programming further incorporates a security system which severely hinders unauthorized tampering with RACT programming. The host system manages a comprehensive database which includes information describing the configuration of all its client RACTs. Host system processes are designed for compatibility with the corresponding processes in the RACTs. Hence, a communication system in which predefined messages are successfully passed between the host system and RACTs is described.

53 Claims, 11 Drawing Sheets

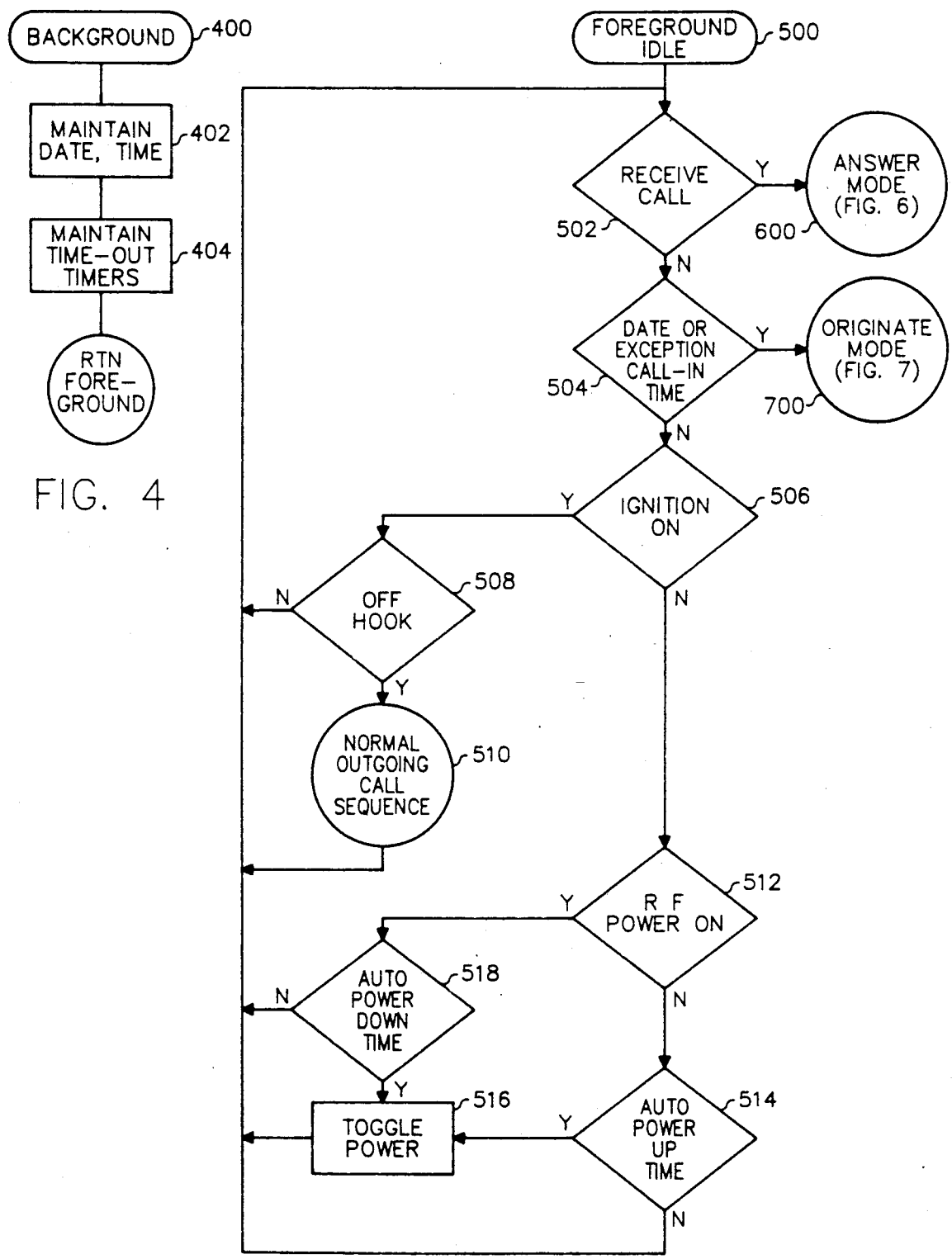

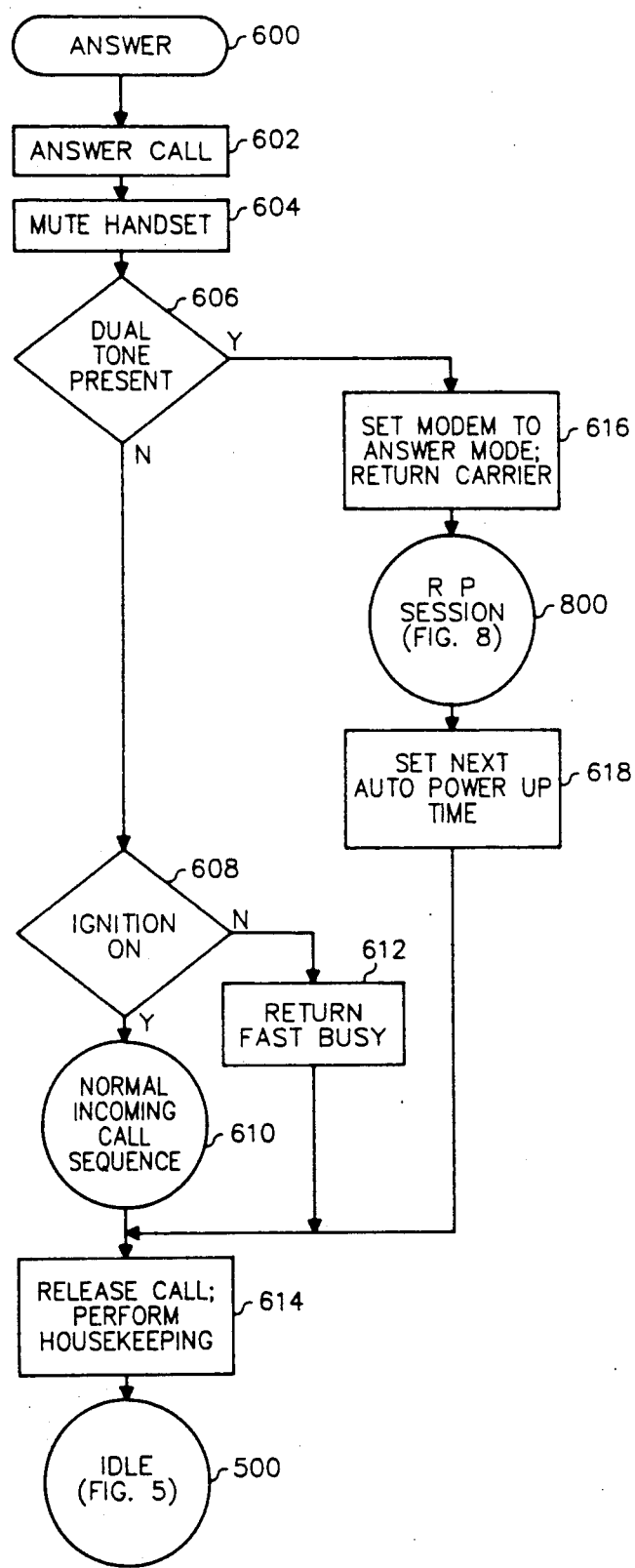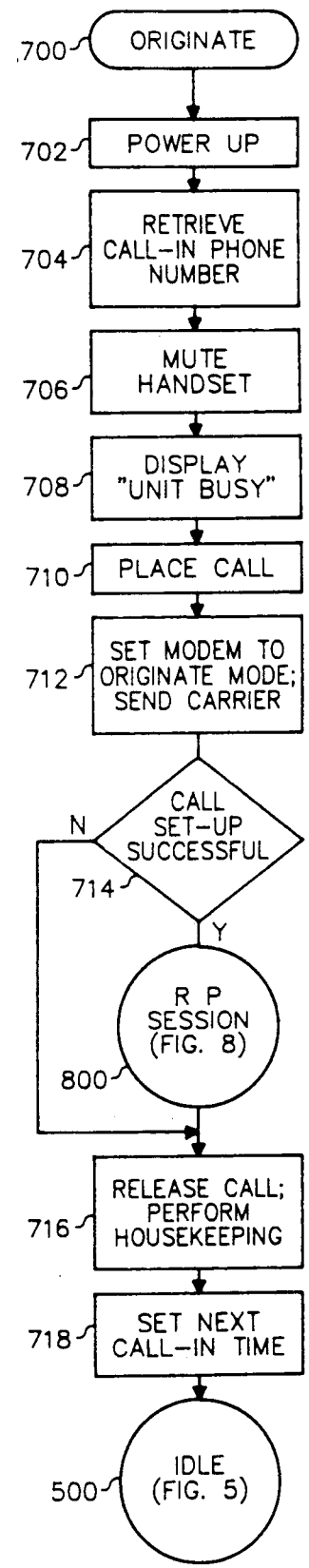
FIG. 6
FIG. 7

REMOTE ACCESSING SYSTEM FOR CELLULAR TELEPHONES

TECHNICAL FIELD OF THE INVENTION

The present invention relates generally to radio communications. More specifically, the present invention relates to cellular mobile radiotelephones in which operational programming data is remotely accessed through the public switched telephone network (PSTN) and to a system for management of and communication with a multiplicity of such remotely accessible cellular telephones.

BACKGROUND OF THE INVENTION

Existing cellular telephones in the mass mobile radiotelephone marketplace contain numerous programmable parameters which define how the cellular telephones operate. Such parameters include, but are not limited to, the telephone number or mobile identification number (MID) assigned to the cellular telephone, the system identification number (SID) of the cellular system to which the user subscribes, and numerous optional features of the cellular telephone. Such programmable parameters are well known to those skilled in the art and are not described in detail herein. However, the following instruction manual, which is incorporated herein by reference, provides additional information concerning the definition and operation of existing cellular telephones:

"Dyna T*A*C Cellular Mobile Telephone,"
Instruction Manual No. 68P81066E40-C, 1985,
Motorola Technical Writing Services, 1301 E.
Algonquin Rd., Schaumburg Ill. 60196.

When a customer initially subscribes to a cellular service or later decides to modify his or her cellular telephone's operation, such parameters are programmed into the phone. Some models of cellular telephones permit limited programming of such parameters through the telephone's handset. However, the programming of a cellular telephone is an exacting, and error prone process, and mass market customers are discouraged from doing such programming themselves. Rather, programming machines or consoles may be provided at customer service and sales facilities. Such consoles easily program cellular telephones in an error-free manner.

However, the existing console systems for managing the programmability of cellular telephones have many undesirable consequences. As a practical matter, customers must physically take their cellular telephones to locations having consoles in order for the consoles to perform certain operations, such as diagnostics or feature upgrading, related to the programming of the customers' cellular telephones. This requirement places a burden on the customers by forcing them to use extensive amounts of their time and resources in order to receive such operational service.

Likewise, this physical telephone access requirement places a burden on providers of and sales offices for cellular services by requiring them to provide and maintain consoles compatible with numerous types of cellular telephones. In addition, personnel must be technically capable of operating the consoles and of performing at least low level diagnostics. As a result, mass marketing outlets, such as major retail stores, have typically failed to serve as effective distributors of cellular telephones.

Furthermore, en masse programming modifications for all customers or clients of a cellular service provider (for example, to change features) are impractical with existing cellular telephones due to the extensive burden such en masse modifications would collectively place on the clients. Such en masse programming modifications would currently require all clients to undergo the burden of taking their cellular telephones to a service facility in order to receive new programming. However, en masse programming modifications would be highly desirable in order to reflect changes in "roaming" contractual arrangements made with cellular service providers in certain areas.

Another business advantage of the present system is that it enables different sets of telephone features to be made available to different sets of customers. In particular, it enables the service provider to move individual customers from one class of service (i.e. a 10 feature package) to another class of service (i.e. a 20 feature package) without the customer being required to return to an agent site.

Furthermore, a cellular service provider faces fierce competition in getting and keeping its customers. Cellular service providers realize that up-to-date information concerning their customers and client cellular telephones is of vital importance in getting and keeping the customers while still making a profit. In addition, this fierce competition occasionally motivates third party agents to engage in fraud and other forms of abuse with respect to customer lists and cellular telephone programming. Current information about cellular telephone configurations and customer bases would serve as a useful investigation tool in policing the activities of such third party agents. However, existing cellular telephones have no features which easily allow a cellular service provider to obtain current information about customers or their cellular telephones.

Remotely programmable cellular telephones have been designed for use in connection with public transportation. Such telephones operate as credit-card cellular payphones. However, major differences exist between a credit-card network and the mass mobile radiotelephone marketplace. For example, in a credit-card cellular payphone telephone, programmability is limited to those features which are necessary for the operation of the payphone network. In addition, such credit-card phones form only a small network in which the payphone service providers can exercise a large amount of control. The nature of a small network and the extensive control exercised therein permit such credit-card phones to virtually ignore data security and tampering problems which are present in connection with mass markets over which little control can be exercised. In addition, from a user's perspective such credit-card phones are currently dedicated to the transmission of voice and are not designed to transmit user data, such as from a user's facsimile machine or computer. Consequently, remote programmability instruction data need not be distinguished from user data.

In addition, various limited-purpose systems, such as emergency call box systems, security systems, and the like, incorporate cellular telephones as part of the systems. Such systems occasionally permit a system administrator to alter system operation. However, such systems typically use conventional cellular telecommunication components to link a remote controller to the administrator. Consequently, the cellular telecommunication components need not interpret signals being transported therethrough to differentiate between different types of signals. Rather, the cellular telecommunication components simply operate in a conventional manner and the remote controller is specifically designed to serve the limited-purpose application to which the system is dedicated.

SUMMARY OF THE INVENTION

Accordingly, it is an advantage of the present invention that an improved cellular telephone is provided.

Another advantage is that the present invention provides an improved method of operating a cellular telephone.

A further advantage of the present invention is that a cellular telephone which is remotely programmable is provided.

Yet another advantage is that the present invention provides an interface with existing cellular telephones to support remote programming.

Another advantage is that the present invention provides a method of automatically establishing data communication between a cellular telephone and an administration system.

Yet another advantage is that the present invention provides a security structure to severely hinder remote unauthorized access of and tampering with cellular telephone programming.

A further advantage is that the present invention provides a data communication system which minimizes the amount of air-time required for remote programming sessions.

Still another advantage is that the present invention refrains from impairing normal cellular telephone operations, including data communication.

Another advantage is that the present invention provides a system for managing a multiplicity of remotely accessible cellular telephones.

Yet another advantage is that the present invention provides a method for modification of programming in a multiplicity of remotely accessible cellular telephones.

The above and other advantages of the present invention are carried out in one form by a remotely accessible cellular telephone (RACT) which includes operational data stored therein. The RACT includes a non-volatile, erasable memory in which said operational data is stored. An RACT processor is coupled to the memory and is programmed to manipulate the operational data. An audio bus transmits audio frequency signals and is coupled to an audio port of an RACT modem. A data port of the modem is coupled to the processor. Hence, the modem communicates data between the processor and the audio bus. The RACT additionally includes a signal detector, which has an input coupled to the audio bus and an output coupled to the processor. The signal detector is configured to detect the occurrence of a predetermined audio signal.

The above and other advantages of the present invention can be carried out in other embodiments by a method of permitting external access to operational data programmed in a remotely accessible cellular telephone. The method involves detecting the occurrence of an incoming call and answering the incoming call. In another step the call is monitored to detect an identifying signal, and to provide external access to the operational data only if the identifying signal is detected. When such external access is provided, the call transports data communication utilizing only audio frequencies selected from a known set of audio frequencies. The identifying signal is not included in this known set of audio frequencies.

The above and other advantages of the present invention can be carried out in yet another form by a method of remotely communicating with a cellular telephone which has operational data stored therein. The method calls for storing a phone number which corresponds to an administration system and storing a specified call-in time. The method maintains continually updated data which defines a then-current date and time. This date and time data is monitored to detect the occurrence of the call-in time. When the call-in time occurs, the present invention automatically dials the phone number to establish data communication with the administration system. A subsequent step then allows the administration system to access the operational data.

The above and other advantages of the present invention are carried out in another form by a method of operating a remotely accessible cellular telephone (RACT) which has operational data, including a unique identifying number, stored therein. The method grants external access to the operational data. then receives data communication organized as an "identify" command. The method returns data communication in response to the received "identify" command. and this returned data communication includes the unique identifying number.

The above and other advantages of the present invention are carried out in another form by an administration system for managing a multiplicity of client remotely accessible cellular telephones (RACTs). The system includes a memory which stores data describing parameters characteristic of each of the multiplicity of RACTs. A processor is coupled to the memory and is programmed to manipulate the stored data to remotely communicate with a selected one of the client RACTs. A data port of a modem is coupled to the processor, and an audio port of the modem is configured for connection to a telephone line. An audio signal generator has an output which is selectively coupled to the audio port of the modem. This output is coupled to the audio port in response to a control signal supplied from the processing means.

The above and other advantages of the present invention are carried out in yet another form by a method of managing a multiplicity of client remotely accessible cellular telephones (RACTs). The method stores data describing a mobile identification number (MID) and a security key for each of the client RACTs. One of the RACTs is identified for participation in a remote programming session. The method retrieves the MID for the identified RACT and places a call to this MID. In order to gain access to operational data within the identified RACT, the method transmits a password based upon the security key associated with the identified RACT during the call.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

FIG. 4 shows a flowchart of a background process utilized by the RACT portion of the present invention;

FIG. 5 shows a flowchart of an idle process utilized by the RACT portion of the present invention;

FIG. 6 shows a flowchart of an answer process utilized by the RACT portion of the present invention;

FIG. 7 shows a flowchart of an originate process utilized by the RACT portion of the present invention;

DETAILED DESCRIPTION OF THE PREFERRED EMBODIMENTS

Figure 1A:
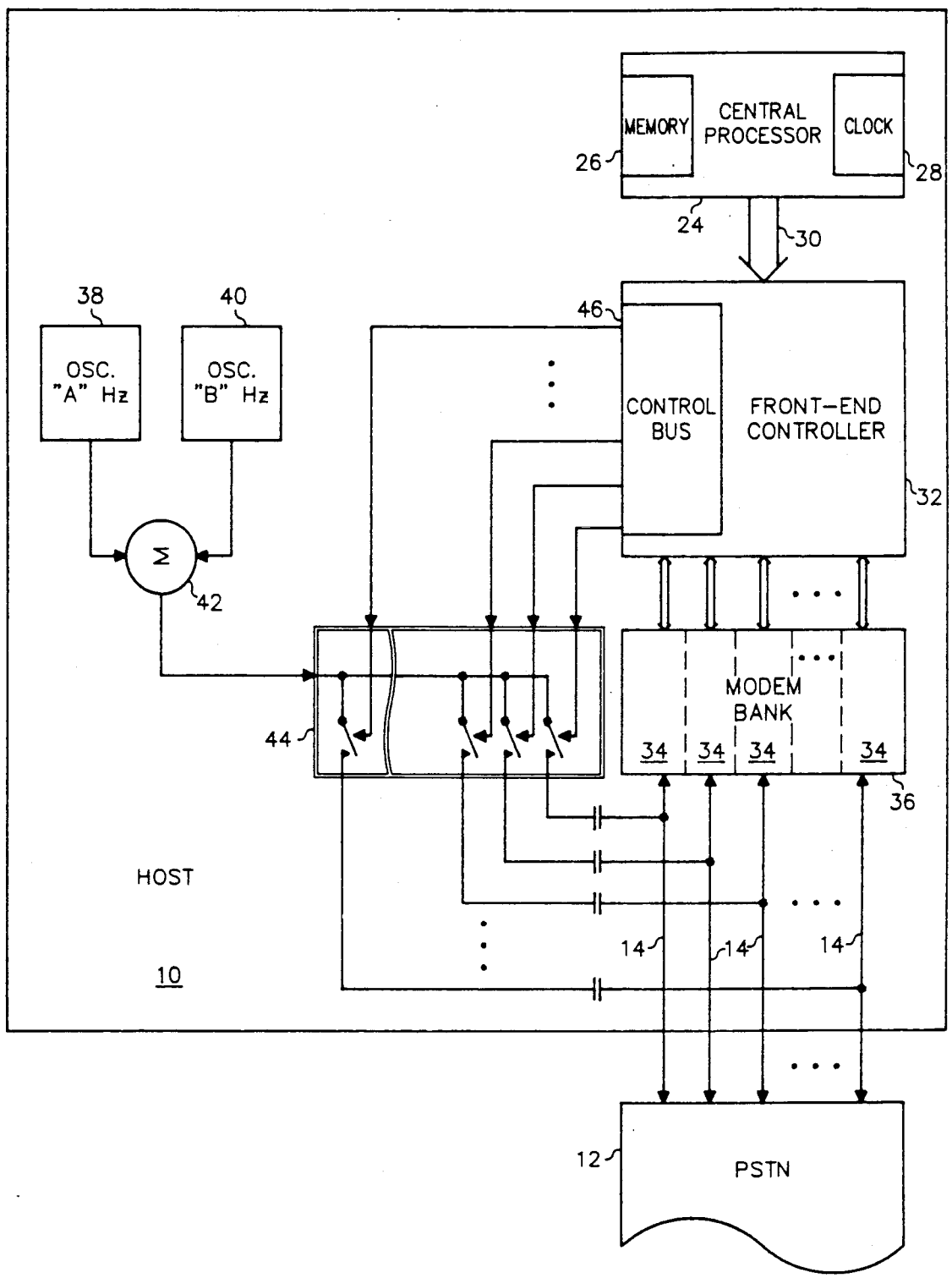
FIG. 1A shows a block diagram of an administration system portion of the present invention.
Figure 1B:
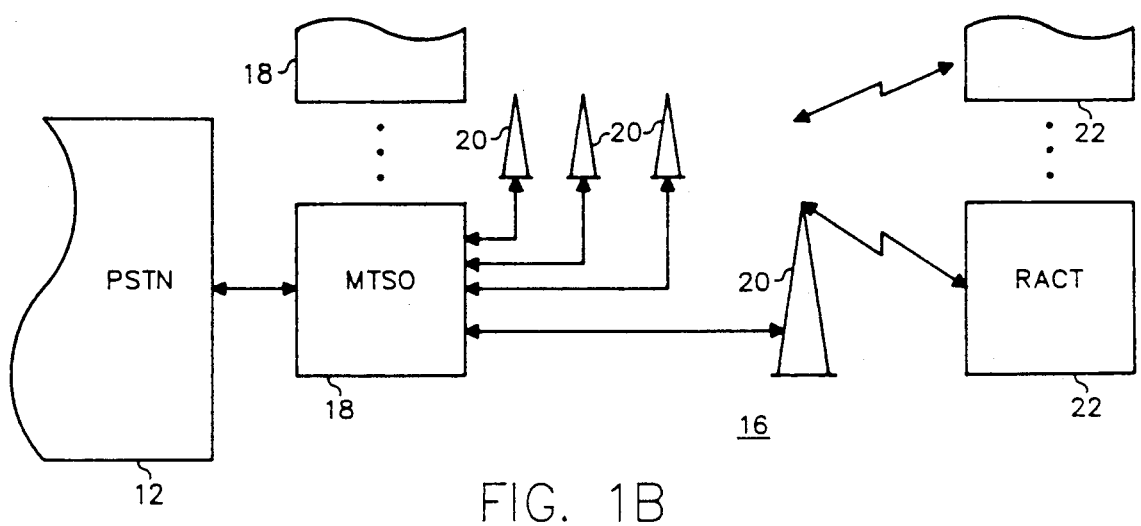
FIG. 1B shows a block diagram of a cellular system portion of the present invention.

FIGS. 1A and 1B together illustrate the environment in which the present invention operates. FIG. 1A shows a block diagram of an administration system or host portion 10 of the present invention. Host 10 is coupled to the public switched telecommunications network (PSTN) 12 through a plurality of phone lines 14. Phone lines 14 are conventional, and PSTN 12 is well known and understood by those skilled in the art of telecommunications. In particular, PSTN 12 includes a vast interconnected arrangement of local and long distance central offices and carriers.

FIG. 1B shows a block diagram of a cellular system portion 16 of the present invention. Cellular system 16 is coupled to PSTN 12 in a conventional manner and includes one or more of conventional mobile telephone switching offices (MTSOs) 18. MTSOs 18 are connected to their respective conventional cell sites 20 in a conventional manner. A multiplicity of client remotely accessible cellular telephones (RACTs) 22 communicate through cell sites 20, MTSOs 18, and PSTN 12 to host 10. Those skilled in the art will recognize by the discussion presented herein that "remotely accessible" refers to remote computerized access to data programming of RACT 22 itself. In addition, client RACTs 22 communicate in a conventional manner with other telecommunications devices, including conventional voice telephone instruments, facsimile machines, data terminals, and the like (not shown), which may be connected to PSTN 12.

As shown in FIG. 1A, host 10 includes a central processor 24. Either a single centrally located computer or a distributed network of computers may advantageously serve as central processor 24. Processor 24 includes a memory 26 and a clock 28. Memory 26 represents a mass storage, non-volatile read-write memory in which host 10 contains a stored database. This database contains information describing parameters which characterize each one of the multiplicity of RACTs 22 that are clients of host 10. Clock 28 constantly maintains data which prescribes a current time and date for use by host 10. In addition, processor 24 includes other peripheral devices, such as terminals, printers, and the like (not shown), which are commonly utilized in connection with computer systems.

Central processor 24 is coupled through a data bus 30 to a front end controller 32. Controller 32 represents a computer which is conventionally configured to efficiently manage data communications into and out from central processor 24. Accordingly, controller 32 is coupled to data ports of data modems, or simply modems, 34 included in a modem bank 36. Audio ports of modems 34 are coupled to individual ones of phone lines 14. Modems 34 transfer communication data as well as control data, such as carrier detect and ring detect, to and from controller 32. Modems 34 also transfer communication data which have been modulated into audio frequency signals to and from PSTN 12. The hardware configurations and interconnections of items 24–36 are all generally conventional in the arts of computer systems and telecommunications. Those skilled in such arts may select appropriate configurations and specifications for items 24–36 so that an acceptable reliability, memory capacity, and processing power are available to support the number of client RACTs 22 associated with host 10.

First and second audio frequency oscillators 38 and 40, respectively, have outputs which are coupled to inputs of a summing device 42. Oscillators 38 and 40 are configured to generate "A" and "B" diverse audio frequency signals, respectively. The precise "A" and "B" frequency values are not important features of the present invention. Oscillators 38 and 40 are designed to hold these frequencies within a 2%, and more preferably a 1%, tolerance of the "A" and "B" frequency values. An output of summing device 42 is coupled to inputs of individual switches in a switching matrix 44. A control bus portion 46 of front end controller 32 supplies individual control bits to control inputs of matrix 44. Individual output ports of matrix 44 are coupled to corresponding ones of phone lines 14 at the audio ports of modems 34. Accordingly, summing device 42 generates a dual-tone audio signal simultaneously exhibiting the "A" and "B" frequencies. In other words, the dual-tone audio signal exhibits a summed combination of the "A" and "B" frequencies. This dual-tone signal is selectively supplied to and removed from any one of phone lines 14 under the control of front end controller 32.

The dual-tone signal serves as a unique identifying signal when detected by a RACT 22 (see FIG. 1B). The above-discussed frequencies are chosen so that neither of the "A" and "B" frequencies of the dual-tone signal are equal to signal frequencies used in conventional data communications and conventional signalling within PSTN 12. Thus, the dual-tone signal is easily distinguished from such conventional data communication signals and such conventional PSTN 12 signalling. Moreover, a RACT 22 may quickly and easily detect the presence of the dual-tone signal and distinguish it from any signal generated by modems 34 or other modems which adopt conventionally accepted data communication standards.

Figure 2A:
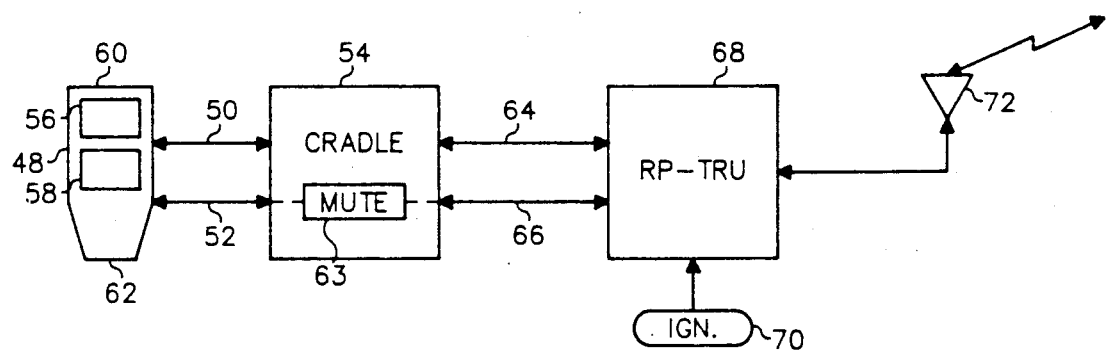
FIG. 2A shows a block diagram of a first embodiment of a remotely accessible cellular telephone (RACT) portion of the present invention.
Figure 3A:
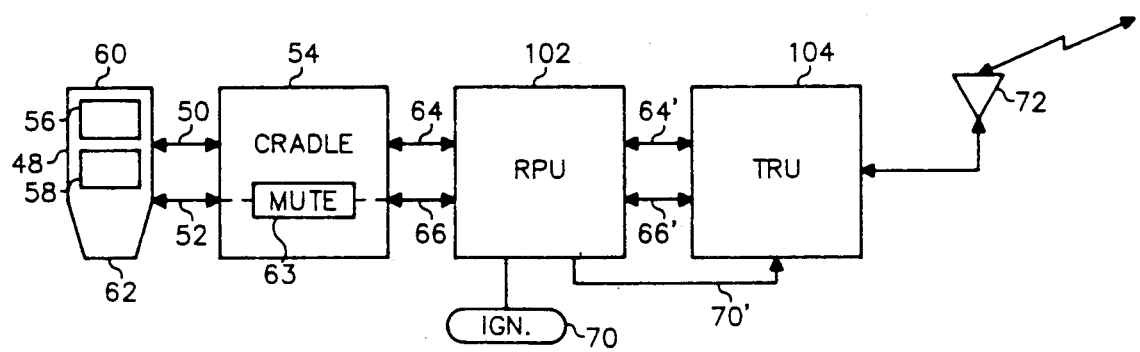
FIG. 3A shows a block diagram of a second embodiment of the RACT portion of the present invention.
Figure 2B:
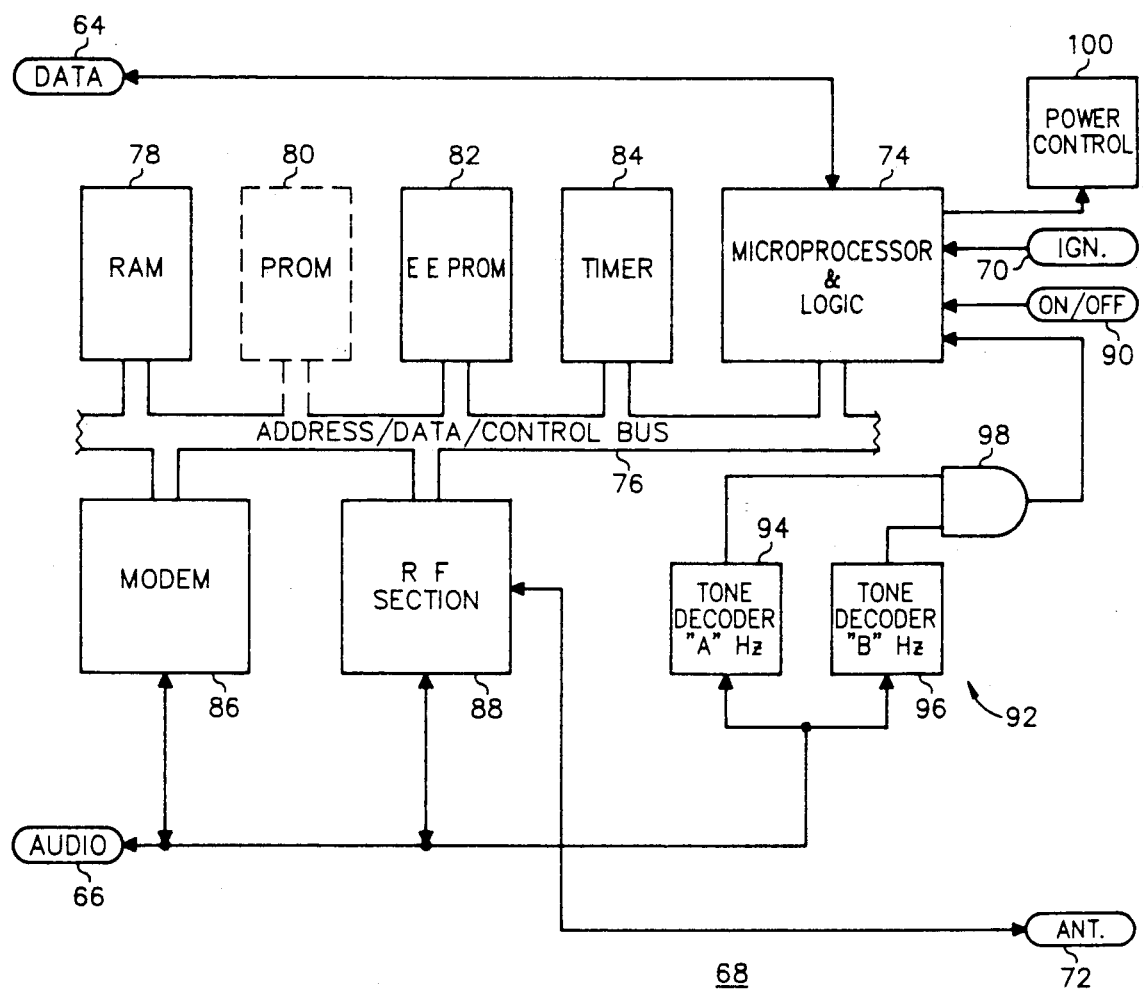
FIG. 2B shows a block diagram of a remotely programmable transmit-receive unit (RP-TRU) portion of the first embodiment of the present invention.
Figure 3B:
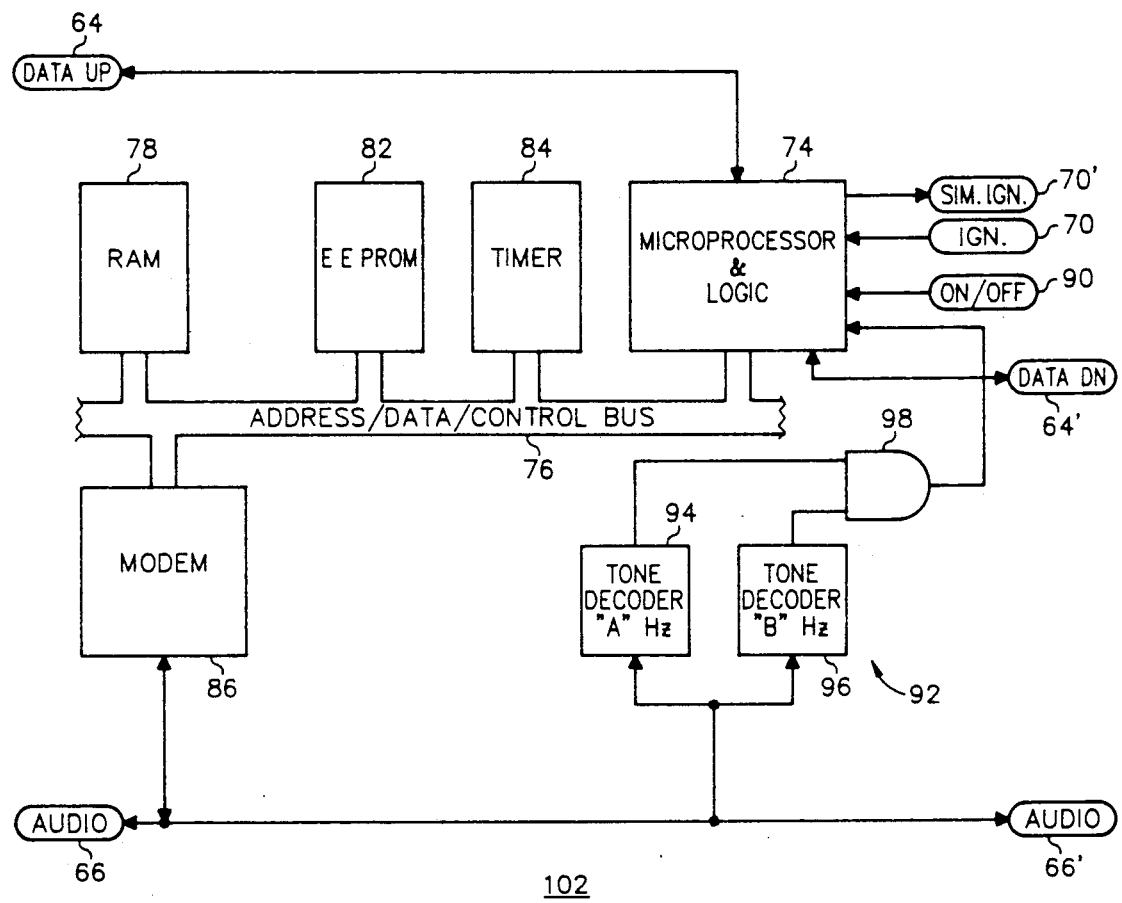
FIG. 3B shows a block diagram of a remotely programmable unit (RPU) portion of the second embodiment of the present invention.

FIGS. 2A and 2B together show block diagrams depicting a first embodiment of a hardware configuration for RACT 22, and FIGS. 3A and 3B together show block diagrams depicting a second embodiment of a hardware configuration for RACT 22. With reference to FIG. 2A, RACT 22 includes a handset 48 which is coupled through a first serial data bus 50 and a first audio bus 52 to a cradle 54. Handset 48 includes a display 56, a keypad 58, a speaker 60, and a microphone 62. Cradle 54 includes a muting section 63, which operates to turn off all audio signals to speaker 60 and from microphone 62 of handset 48. Handset 48 and cradle 54 cooperate and perform functions which are conventional in the art of cellular telephones. The above-discussed reference manual may be consulted for additional information relating to the operation of handset 48 and cradle 54.

A second serial data bus 64 and a second audio bus 66 interconnect cradle 54 with a remotely programmable transmit-receive unit (RP-TRU) 68. As illustrated in FIG. 2A, an ignition signal 70 represents one of the signals sensed by RP-TRU 68, and an antenna 72, through which RACT 22 communicates with a cell site 20 (see FIG. 1B), is also coupled to RP-TRU 68. Ignition signal 70 exhibits a state responsive to the ignition of a vehicle in which RACT 22 may be installed. It generally indicates whether the vehicle is running or not. However, ignition signal 70 may simply represent a user-activated "power-on" signal when RACT 22 is a portable or other phone that is not installed in a vehicle. While conventional cellular mobile radiotelephones include a transmit-receive unit (TRU), this first embodiment of the present invention modifies a conventional TRU to accommodate the remote accessibility features of the present invention.

Specifically, as shown in FIG. 2B, which presents a block diagram of RP-TRU 68, a microprocessor and logic section 74 is coupled to serial data bus 64 and to an internal address/data/control bus 76. Through bus 76, section 74 communicates with a random access memory (RAM) 78, a programmable read only memory (PROM) 80, a non-volatile, read-write memory 82, such as an electrically erasable PROM (EEPROM), a timer 84, a data port of a modem 86, and a data port of an RF section 88. Those skilled in the art will understand that RAM 78 is one example of a volatile read-write type of memory, and that PROM 80 is one example of a non-volatile read-only type of memory. Of course, those skilled in the art will recognize that battery-backed-up RAM and other memory devices may also serve as non-volatile read-write memory 82. Audio ports of modem 86 and RF section 88 are additionally coupled to audio bus 66, and timer 84 preferably is coupled to an interrupt input of section 74. An RF port of RF section 88 is coupled to antenna 72.

Section 74 senses the state of ignition signal 70 and of an on/off signal 90. In addition, section 74 senses the state of an output from a signal detection circuit 92. Signal detection circuit 92 includes first and second tone decoders 94 and 96, respectively. Inputs of tone decoders 94 and 96 are coupled to audio bus 66, and outputs of tone decoders 94 and 96 are coupled to inputs of a logic element 98, which performs a logical AND function. The output of element 98 serves as the output of signal detection circuit 92 and is coupled to a sense input of section 74. Section 74 additionally provides a control output bit which is coupled to a power control section 100.

Except for modem 86 and signal detection circuit 92, the hardware of RP-TRU 68 generally resembles a conventional TRU portion of a conventional cellular telephone. However, PROM 80 in RP-TRU 68 represents an optional section which may advantageously be omitted by increasing the size of non-volatile, read-write memory 82 to accommodate data previously stored in PROM 80. Of course, programming included in memories 78-82 will differ from conventional programming, as discussed below. The above-discussed reference manual may be consulted for additional information relating to the operation of the conventional portions, such as RF section 88, of RP-TRU 68.

Microprocessor and logic section 74 generally controls the operation of RP-TRU 68. In conjunction with timer 84, section 74 maintains a clock and calendar. Moreover, power is continually supplied to section 74, timer 84, and supporting sections of RP-TRU 68 so that data describing the date and time remain current even when ignition to a vehicle in which RACT 22 is installed is off. As illustrated by power control section 100, section 74 controls the application and removal of power to the remaining portions, and particularly RF section 88, of RACT 22. On/off signal 90 informs section 74 of the current power state of RACT 22, and section 74 controls the application of power in response to ignition signal 70 and the date and time data.

For the purposes of the present invention, data programmed in non-volatile, read-write memory 82 and PROM 80 generally represent operational data. This data does not change during or due to the normal operation (i.e. as a tool to facilitate communication) of RACT 22, and it serves as the data which programs or defines the operational performance of RACT 22. In particular, non-volatile, read-write memory 82 contains number assignment modules (NAMs) which include the original activation-programmable and user-programmable parameters that configure the operational features of RACT 22. If PROM 80 is omitted, non-volatile, read-write memory 82 additionally includes the actual instruction codes executed by microprocessor section 74. In contrast to the operational data generally included in memories 80-82, RAM 78 generally stores temporary data, which changes during the normal operation of RACT 22. Such temporary data include cell management, status, or activity log data which change during the normal operation of RACT 22 in a cellular network.

Modem 86 represents a conventional modem circuit. Consequently, modem 86 recognizes only audio signals on audio bus 66 which belong to a well known, predetermined set of audio frequencies. Likewise, modem 86 supplies only audio signals which belong to this predetermined set of audio frequencies to audio bus 66. Modem 86 preferably operates at data rates of either 300 or 1200 bits per second, depending on control data supplied by microprocessor section 74. Communicated data and control data, such as carrier detect, are communicated to and from microprocessor section 74 through bus 76. On the other hand, ring detect is detected by microprocessor section 74 by monitoring data commands on serial data bus 64.

Signal detection circuit 92 complements oscillators 38 and 40, discussed above in connection with FIG. 1A. Specifically, first and second tone decoders 94 and 96 detect audio signals which exhibit the above-discussed "A" and "B" audio frequencies, respectively. Moreover, each of tone decoders 94 and 96 holds these frequencies to within a 2%, and preferably a 1%, tolerance. While the preferred embodiment utilizes conventional analog circuits to implement tone decoders 94 and 96, nothing prevents one or more digital signal processors from providing these filtering functions. Accordingly, the output from signal detection circuit 92 indicates whether or not the unique dual-tone identifying signal supplied by host 10 (see FIG. 1A) is present in an audio signal being received at RACT 22. As discussed above, this dual-tone identifying signal is not normally generated in the course of conventional data communication or in PSTN signalling.

FIG. 3A shows a block diagram of a second embodiment of RACT 22. Handset 48 and cradle 54 are both conventional and cooperate as discussed above in connection with FIG. 2A. A remote programming unit (RPU) is coupled to cradle 54 in lieu of RP-TRU 68, discussed above in connection with FIGS. 2A-2B. Specifically, serial data bus 64 and audio bus 66 are coupled to RPU 102. In addition, ignition signal 70 is coupled to RPU 102. RPU 102 regenerates serial and audio busses 64 and 66 as serial data bus 64' and audio bus 66', respectively. In addition, RPU 102 generates a simulated ignition signal 70'. A conventional transmit-receive unit (TRU) 104 is coupled between RPU 102 and antenna 72. Conventional TRU 104 is coupled to serial data bus 64', audio bus 66', and simulated ignition signal 70' rather than to serial data bus 64, audio bus 66, and ignition signal 70 as occurs in a conventional installation. Accordingly, this second embodiment of RACT 22 is configured as a kit which may be installed with a conventional cellular telephone to convert the conventional cellular telephone into RACT 22.

FIG. 3B presents a block diagram of a preferred RPU 102. The hardware of RPU 102 resembles the hardware of RP-TRU 68, discussed above in connection with FIG. 2B. However, since RPU 102 does not perform the TRU function, it omits RF section 88 (see FIG. 2B). In addition, RPU 102 omits power control section 100 (see FIG. 2B). On the other hand, serial data bus 64, microprocessor and logic section 74, address/data/control bus 76, RAM 78, non-volatile, read-write memory 82, timer 84, modem 86, signal detection circuit 92, audio bus 66, ignition signal 70, and on/off signal 90 all cooperate and function substantially as described above in connection with FIG. 2B. As discussed above in connection with RP-TRU 68, at least portions of RPU 102 remain energized even when ignition is off so that current date and time data may be maintained.

Moreover, RPU 102 includes a few additional features which are not included in RP-TRU 68 (see FIG. 2B). For example, audio bus 66 exits RPU 102 for use as audio bus 66'. Likewise, serial data bus 64' is coupled to microprocessor and logic section 74. During normal, non-remote access operation of RPU 102, section 74 is transparent to data being transmitted on serial data busses 64 and 64'. In other words, in this mode of operation, data transmitted away from TRU 104 toward cradle 54 (see FIG. 3A) arrives at cradle 54 without interference from RPU 102, and data transmitted away from cradle 54 toward TRU 104 arrives at TRU 104 without interference from RPU 102. However, remote access to operational data within TRU 104 occurs through the issuance and interpretation of data messages on serial data bus 64'. Such messages are known and understood by those skilled in the art and are described in detail in the above-listed reference manual.

In a conventional cellular installation, ignition signal 70 serves as the major determinant of whether a conventional TRU operates power control section 100 (see FIG. 2B) to energize or de-energize a conventional cellular telephone. RPU 102 provides simulated ignition signal 70' at its output, which conventional TRU 104 senses in lieu of ignition signal 70. Simulated ignition signal 70' responds to both the state of ignition signal 70 and to the date and time data maintained in conjunction with timer 84. Hence, RPU 102 causes conventional TRU 104 to alter the conventional operation of power control section 100 (see FIG. 2B) in accordance with the method of the present invention, discussed below.

While the above discussion presents two embodiments of hardware configurations for RACT 22, those skilled in the art will understand that RACT 22 may have still other embodiments. For example, the precise location of RPU 102 is not an important feature of the present invention. Those skilled in the art may adapt the teaching of the present invention to an application where RPU 102 resides in the charging stand of a portable cellular phone and not in the phone itself. This and other configurations are intended to be included within the scope of the present invention.

FIGS. 4-10 provide flowcharts of various processes utilized by either of the above-discussed embodiments of RACT 22 in accordance with the method of the present invention. Generally speaking, microprocessor and logic section 74 of RP-TRU 68 (see FIG. 2B) or of RPU 102 (see FIG. 3B) performs this process by executing programming instructions stored in memories 78-82 (see FIGS. 2B and 3B).

FIG. 4 shows a flowchart of a background process 400 performed by RACT 22. Background process 400 is preferably, but not necessarily, interrupt driven by inputs received from timer 84 (see FIGS. 2B and 3B). These interrupts occur in response to a timed event. For example, timer 84 may advantageously generate interrupts at regular intervals. When such interrupts are received, RACT 22 performs process 400. A task 402 is performed at such regular intervals to service counters which keep track of time. Hence, such counters maintain the current time of day and date. Data which describe the current time and date are stored in memory 78 (see FIGS. 2B and 3B). As discussed above, the portions of RACT 22 which maintain such date and time data remain continually energized so that the date and time counters are always current.

Background process 400 additionally maintains various time-out timers, as depicted in a task 404. The time-out timers operate as alarm clocks. Various RACT 22 processes, which are discussed below, set or program such time-out timers with a duration value. Task 404 determines when the programmed duration expires, and causes such various processes to alter program flow in response to timer expiration. When background process 400 completes all its tasks, it returns program flow to the process being performed immediately prior to performance of background process 400.

FIG. 5 shows a flowchart of a foreground idle process 500 performed by RACT 22. Process 500 generally retains program flow in a loop while monitoring conditions within RACT 22 for the occurrence of an event which requires RACT 22 to take some action. When such an event is detected, as discussed below, program flow transfers to another process to undertake an appropriate action.

As shown at a query task 502, RACT 22 determines whether an incoming call is being received. An incoming call occurs when a ringing event happens, and a ringing event can be detected by monitoring commands on serial data busses 64 and 64' (see FIGS. 2B and 3B) for a ring detect signal. When an incoming call is being received, task 502 routes program flow to an answer mode process 600, which is discussed in more detail below in connection with FIG. 6. However, if this ringing event is not detected in task 502, program flow remains in the process 500 loop, where a query task 504 is performed.

Task 504 generally determines whether to automatically originate an outgoing call, or "call-in," from RACT 22 to host 10 (see FIGS. 1A and 1B). As indicated at task 504 in FIG. 5, the preferred embodiment originates such calls in either of two conditions. The first condition occurs at a predetermined date. Host 10 manages such predetermined dates for all of its client RACTs 22 to minimize cellular air-time consumed by such originated calls while still maintaining a current database of information describing all of its RACTs 22. However, no specific call-in date algorithm is contemplated by the present invention. Rather, the timing of such calls is dynamically programmable by host 10 to meet varying system needs.

Specifically, in memories 78-82 (see FIGS. 2B and 3B) each RACT 22 stores data which describes this call-in date for that RACT 22. This data may include interval data which RACT 22 has previously used to calculate a specific call-in date. In the preferred embodiment, such intervals are programmable by host 10 to indicate periods of 0, 1, 2, 7, 30, 90, 180, or 365 days.

The stored call-in timing data may additionally describe a particular time or period during the specified call-in date when such calls should occur. In the preferred embodiment, host 10 defines a call-in period which is late at night, when cellular telecommunication traffic is otherwise at a minimum. Thus, the incoming calls from RACTs 22 to host 10 generally use public cellular telecommunication capacity which would otherwise go unused. In addition, such low-traffic call-in periods minimize the contention between automatically originated calls to host 10 and the normal uses of RACTs 22 by their owners.

Moreover, the overall low-traffic call-in period utilized by all of client RACTs 22 is preferably subdivided so that groups of RACTs 22 have their own discrete sub-periods within which to make their automatic calls to host 10. For example, RACTs 22 having a least significant electronic serial number (ESN) digit of a "0" are assigned a first sub-period, RACTs 22 having a least significant ESN digit of a "1" are assigned a second sub-period, and so on. The dividing of the overall call-in period minimizes collisions between RACTs 22 which simultaneously attempt calls to host 10. As a result, overall connectivity between all client RACTs 22 and host 10 improves. However, as with the call-in date data, no specific call-in time-of-day algorithm is contemplated by the present invention. Rather, the timing of such calls are dynamically programmable by host 10 to meet varying system needs.

Task 504 compares the current date and time as maintained by task 402 (see FIG. 4) to the call-in timing data. When the current date and time matches the call-in data, task 504 routes program flow to an originate mode process 700, which is discussed in more detail below in connection with FIG. 7.

Task 504 additionally routes program flow to process 700 when an exception event occurs. An exception event occurs when RACT 22 determines that operational programming within RACT 22 has been altered. As discussed above, operational data does not normally change as a result of the normal operation of RACT 22. However, if the programming of RACT 22 has been tampered with, such operational data most likely changes. A checksum of this operational data, or at least an essential portion of it, is stored along with the operational data during initial customer activation and whenever authorized program changes occur. The present invention contemplates the use of a conventional checksum technique, and this checksum preferably covers at least a number assignment module (NAM) for RACT 22. For the purposes of the present invention, the checksum technique is simple and effective. However, it should be recognized that other exception trapping, error detection, and error correction techniques could be used as well.

During task 504, or on some other periodic basis, RACT 22 recalculates the checksum over the same portion of data which the stored checksum describes. Task 504 then compares the recalculated checksum against the stored checksum. If the two checksums differ, an exception event has occurred. The present invention contemplates either immediately transferring program flow to process 700 or queuing an exception call-in for a later time. Such queuing may be accomplished by altering the call-in data, discussed above, to happen at some soon-to-occur point in time. For example, call-in data may be altered to set the call-in date to equal the current date. Then, the automatic call to host 10 occurs when process 500 encounters its assigned call-in time-of-day on the date that the exception is discovered.

When task 504 does not detect a date or exception call-in time, process 500 performs a query task 506. Task 506 senses the state of ignition signal 70 (see FIGS. 2A-3B) to determine whether a vehicle in which RACT 22 is installed is running or whether a user has switched power on. If ignition is on, process flow proceeds to a query task 508, which monitors messages on serial data bus 64 (see FIGS. 2A-3B) to determine whether handset 48 (see FIGS. 2A and 3A) is off hook. If handset 48 is not off hook, program flow loops back to task 502, discussed above. If handset 48 is off-hook, program flow continues through process 510, which performs a conventional outgoing call sequence, before looping back to task 502. Since RACT 22 utilizes the conventional outgoing call sequence, the operation of the present invention provides almost no alteration in the normal outgoing call procedures to which users of RACTs 22 may have become accustomed.

When task 506 determines that ignition is off, process 500 determines whether to automatically energize or de-energize RACT 22. Generally speaking, RACT 22 automatically energizes itself to listen for a potential incoming call from host 10. Specifically, a query task 512 monitors the on/off signal (see FIGS. 2B and 3B) to determine whether power to non-essential portions of RACT 22, particularly RF section 88 (see FIGS. 2B and 3B), is energized. If RACT 22 power is off, a query task 514 examines current date and time data to determine whether to turn power on. Task 514 compares wake-up window data, stored in memories 78–82, with the current date and time data in this examination. As discussed above in connection with the call-in timing data of task 504, the wake-up data is preferably programmed by host 10. The programming may vary on a day-to-day or month-to-month basis in accordance with system needs. In addition, the wake-up data programming for one client RACT 22 need not match such programming for another client RACT 22. Such programming may instruct a RACT 22 to wake-up for a predetermined period during a particular date, or for a predetermined period during every day. Preferably, such programming for all of client RACTs 22 is designed to optimize connectivity between host 10 and RACTs 22 while consuming a minimal amount of public cellular telecommunications capacity and a minimum amount of power from vehicle batteries.

If task 514 decides that the beginning of the wake-up window has not occurred, program flow loops back to task 502. However, if task 514 decides that the beginning of the wake-up window has occurred, a task 516 toggles the power control section 100 (see FIG. 2B) to the on state. In the first embodiment of RACT 22 shown in FIG. 2B, this powering up occurs in a direct manner. However, in the second embodiment shown in FIG. 3B this powering up occurs through the activation of simulated ignition signal 70'. In the second embodiment, conventional TRU 104 interprets the activation of simulated ignition signal 70' as an ignition-on condition and responds by energizing RACT 22.

If task 512 decides that power is already on while ignition is off, program flow proceeds to a query task 518, which determines when to de-energize RACT 22. In a manner similar to that discussed above in connection with task 514, task 518 compares current date and time data with the wake-up window data. If the current date and time match the end of the window, program flow goes through task 516, which de-energizes RACT 22. If current date and time data do not match the end of the window, program flow loops back to task 502.

FIG. 6 shows a flowchart of answer mode process 600, discussed above in connection with task 502 (see FIG. 5). RACT 22 performs process 600 in response to an incoming call. The incoming call is basically answered in a task 602. However, the present invention contemplates various enhancements in answering the incoming call. For example, task 602 may advantageously monitor ignition signal 70 (see FIGS. 2B and 3B) to determine whether the vehicle in which RACT 22 is installed is running or a user-activated switch is otherwise turned on. If ignition signal 70 is active, task 602 relies upon the user to answer the call. However, if the user fails to answer the call within a predetermined period, preferably around 15–30 seconds, task 602 may automatically answer the call. Thus, in a situation where a RACT 22 is locked and the user has forgotten the key, host 10 can be contacted and communicate with the RACT 22 to unlock the phone for the user. Otherwise, the present invention imposes no alteration of the normal operating procedures conventionally established for cellular telephones. On the other hand, if ignition signal 70 is not active, task 602 may mute the audible ring and automatically answer the call without delay. Such calls can be assumed to originate from host 10 since an incoming call will not otherwise be detected while ignition is off, unless it occurs during the wake-up window discussed above in connection with tasks 512–518 (see FIG. 5).

After the incoming call has been answered in task 602, a task 604 mutes the handset. Such muting occurs by issuing appropriate messages to cradle 54 (see FIGS. 2A and 3A) to instruct cradle 54 to activate muting circuits 63. By muting handset 48, audio signals received at RACT 22 are not transmitted to speaker 60, and audio signals picked up by microphone 62 are not transmitted beyond RACT 22. Preferably this muting continues for only a short period of time, which is in the 200–250 msec range in the preferred embodiment. Consequently, it goes substantially unnoticed by a user of RACT 22.

The muting of task 604 occurs to allow RACT 22 to test for a possible remote programming session from host 10. As discussed above in connection with FIGS. 1 and 2B, host 10 generates a unique dual-tone audio identifying signal. As indicated in a query task 606, RACT 22 expects this dual-tone signal to be present in a remote programming session almost immediately after RACT 22 answers an incoming call from host 10. Thus, task 606 senses the output from signal detection circuit 92 (see FIGS. 2B and 3B) to determine whether the dual-tone signal is present. Program flow may remain in task 606 for as long as it takes to be certain whether the dual-tone signal is present. However, in order for the muting of a non-remote programming session call to be as short as possible and for a remote programming session call to be as short as possible, the dual-tone signal and signal detection circuits 92 are configured to assure quick and reliable recognition.

When task 606 determines that the dual-tone signal is not present, program flow proceeds to a query task 608, which tests the state of ignition signal 70 (see FIGS. 2A–3B). If ignition signal 70 is active, program flow proceeds to process 610, which performs conventional incoming call tasks. Such conventional tasks include the removal of muting in handset 48. Since RACT 22 utilizes the conventional incoming call sequence, the operation of the present invention provides almost no alteration in the normal incoming call procedures to which users of RACTs 22 may have become accustomed. For example, the use of a unique identifying audio signal to determine whether to institute a remote programming session permits both normal voice and data communication to proceed unimpeded. In particular, even when a modem carrier signal is present during task 606 above, normal incoming call procedure 610 will be performed.

On the other hand, when task 608 determines that ignition signal 70 is not active, RACT 22 may advantageously return a fast busy signal for 1–2 seconds in a task 612. This situation should only occur during the wake-up window discussed above in connection with tasks 512–518 (see FIG. 5) and when RACT 22 receives a call not originated by host 10. Since ignition is off, RACT 22 assumes that the user is not available to take the call.

After completion of process 610 or task 612, process 600 performs task 614, which releases or hangs up the call. After releasing the call, task 614 performs any housekeeping tasks required as a result of the call. One such housekeeping task may be the writing of data to non-volatile, read-write memory 82 (see FIGS. 2B and 3B), as discussed below in connection with FIG. 8. After task 614, process 600 returns to idle process 500, discussed above in connection with FIG. 5.

Returning to task 606, if the dual-tone signal is detected, program flow proceeds to a task 616. Task 616 sets modem 86 (see FIGS. 2B and 3B) to its answer mode, which is well understood to those skilled in the art of telecommunications. Modem 86 subsequently returns an appropriate data communication carrier signal to host 10. After task 616, a remote programming session procedure 800 is performed. Procedure 800 is discussed in detail below in connection with FIG. 8.

When program flow returns from procedure 800, it supplies data indicating whether or not the session ended successfully. In the preferred embodiment, a task 618 utilizes this data in revising the wake-up window, discussed above in connection with tasks 512-518 (see FIG. 5). For example, if the session ended successfully, programming supplied by host 10 may have set new wake-up window variables which can be used to establish revised wake-up window data. On the other hand, if the session ended unsuccessfully, the wake-up window may be extended or repeated at a different time in accordance with a prearranged communication scheme with host 10 to allow for a subsequent remote programming session. After task 618, process 600 returns to task 614, discussed above.

FIG. 7 shows a flowchart of originate process 700, discussed above in connection with task 504 (see FIG. 5). RACT 22 performs process 700 in response to the occurrence of an event suggesting that RACT 22 should automatically call host 10. Process 700 powers up RACT 22, if necessary, in a task 702, and then proceeds to a task 704. Task 704 retrieves a phone number from a predetermined location in memory 82 (see FIGS. 2B and 3B). This location has been previously programmed with the phone number that host 10 wishes to use to receive RACT-originated calls. Such programming may occur during the manufacture of RACT 22, during the initial sale of RACT 22, or during any prior remote programming session between RACT 22 and host 10.

Next, tasks 706 and 708 mute handset 48 (see FIGS. 2A and 3A) and cause display 56 to indicate a "UNIT BUSY" message, or the like, respectively. Thus, tasks 706 and 708 generally prevent interference by the user of RACT 22. In addition, task 708 informs the user that RACT 22 is not available for use by the user. However, the present invention contemplates the detection of an attempted "911" call in one or more of the tasks following task 706. An underway RPI session may advantageously be interrupted so that the "911" can proceed..

After task 708, a task 710 causes RACT 22 to place or dial a call to the phone number retrieved above in task 704. The placing of a call occurs in a conventional manner through the sending of appropriate commands from microprocessor and logic section 74 to RF section 88 (see FIG. 2B or TRU 102 (see FIG. 3B). Next, a task 712 sets modem 86 to its originate mode, which is well understood to those skilled in the art of telecommunications. After task 712, a task 714 inquires whether host 10 (see FIG. 1) answers the call and responds with an appropriate answer mode carrier. When the answer mode carrier is received, modem 86 sends a data communication carrier detect signal to microprocessor section 74 (see FIG. 2B). When task 714 encounters the carrier detect signal, remote programming session procedure 800 is performed. Procedure 800 is discussed in detail below in connection with FIG. 8.

When program flow returns from procedure 800, it supplies data indicating whether or not the session ended successfully. The call is then released in a task 716, and housekeeping tasks are performed, as discussed above in connection with task 614 (see FIG. 6). Referring back to task 714, if the carrier detect signal is not detected within a predetermined period of time, process 700 declares the session to be unsuccessful, and program flow proceeds to task 716. This predetermined period of time may be measured using a time-out timer, as discussed above in connection with task 404.

After task 716, a task 718 revises the call-in data, discussed above in connection with task 504 (see FIG. 5). Task 718 preferably revises the call-in data in accordance with whether the session was declared as being successful or not. If the session was successful, new call-in dates and times may be calculated based on automatic call-in interval data and programming supplied during the RP session. On the other hand, if the session was unsuccessful, various prearranged algorithms may be performed to determine a new date and time when a call is more likely to be successful. For example, subsequent calls may be attempted after a short delay. If a predetermined number of subsequent calls fail to end successfully, then subsequent calls may be attempted at substantially different times of the day or when ignition is on. After task 718, program flow returns to idle process 500, discussed above in connection with FIG. 5.

Figure 8:
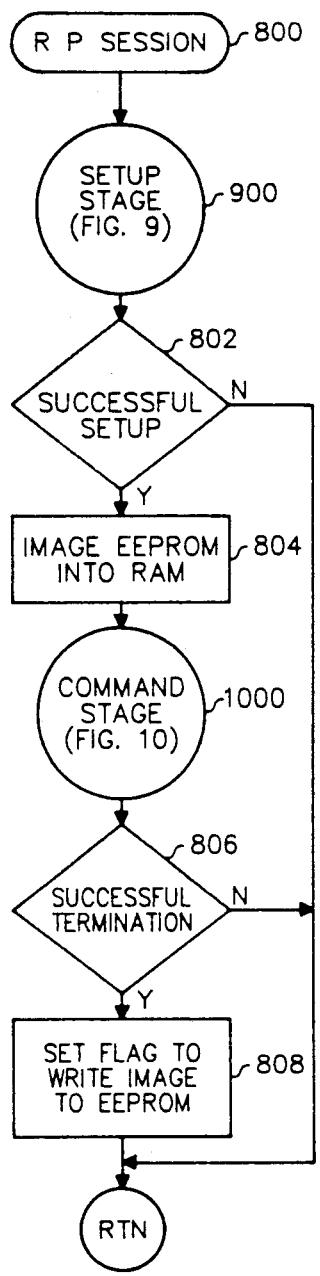
FIG. 8 shows a flowchart of a remote programming session process utilized by the RACT portion of the present invention.

FIG. 8 shows a flowchart of remote programming (RP) session process 800. Process 800 is performed by exchanging data communication between RACT 22 and host 10. Process 800 initially performs a setup stage process 900, which is discussed below in connection with FIG. 9. Generally speaking, setup stage process 900 provides a login procedure through which RACT 22 grants host 10 access to data within RACT 22. After process 900, a query task 802 inquires as to whether setup process 900 terminated successfully. If not successful, program flow simply returns to the process from which RP session procedure 800 was called, and the RP session is declared unsuccessful. On the other hand, if successful, program flow proceeds to a task 804.

Task 804 copies the contents of non-volatile, read-write memory 82 (see FIGS. 2B and 3B), or at least a predetermined number of blocks of data stored within memory 82, into RAM 78. Subsequent manipulation of data by host 10 preferably restricts operations to RAM 78. If any such data is changed during the session, such changes are not actually recorded in memory 82 until later, as discussed below in connection with a task 808.

After task 804, process 800 performs a command stage process 1000. Process 1000, in which RACT 22 receives and executes commands from host 10, is discussed below in connection with FIG. 10. After process 1000, a query task 806 determines whether command stage process 1000 terminated successfully. If not successful, program flow simply returns to the process from which RP session procedure 800 was called, and the RP session is declared unsuccessful. On the other hand, if successful, program flow proceeds to task 808.

Task 808 sets a flag which indicates that the image of non-volatile, read-write memory 82 made in RAM 78 during task 804 should be written back into memory 82. Of course, this task may be omitted if the data contained within this image was not altered during the previous execution of command stage process 1000. Preferably, task 808 does not actually perform the writing into memory 82 itself. Rather, after the call has been released in tasks 614 and 716, discussed above in connection with FIGS. 6 and 7, tasks 614 and 716 examine this flag and perform the writing during housekeeping tasks. If process 1000 is terminated unsuccessfully, the contents of memory 82 are not changed. Consequently, incomplete or inaccurate changes to RACT 22 programming are prevented from corrupting prior RACT 22 programming. By delaying the writing into memory 82, cellular air time is not consumed while such write operations occur, and cellular system resources are conserved. After task 808, program flow returns to the process from which RP session procedure 800 was called, and the RP session is declared as being successful.

Figure 9:
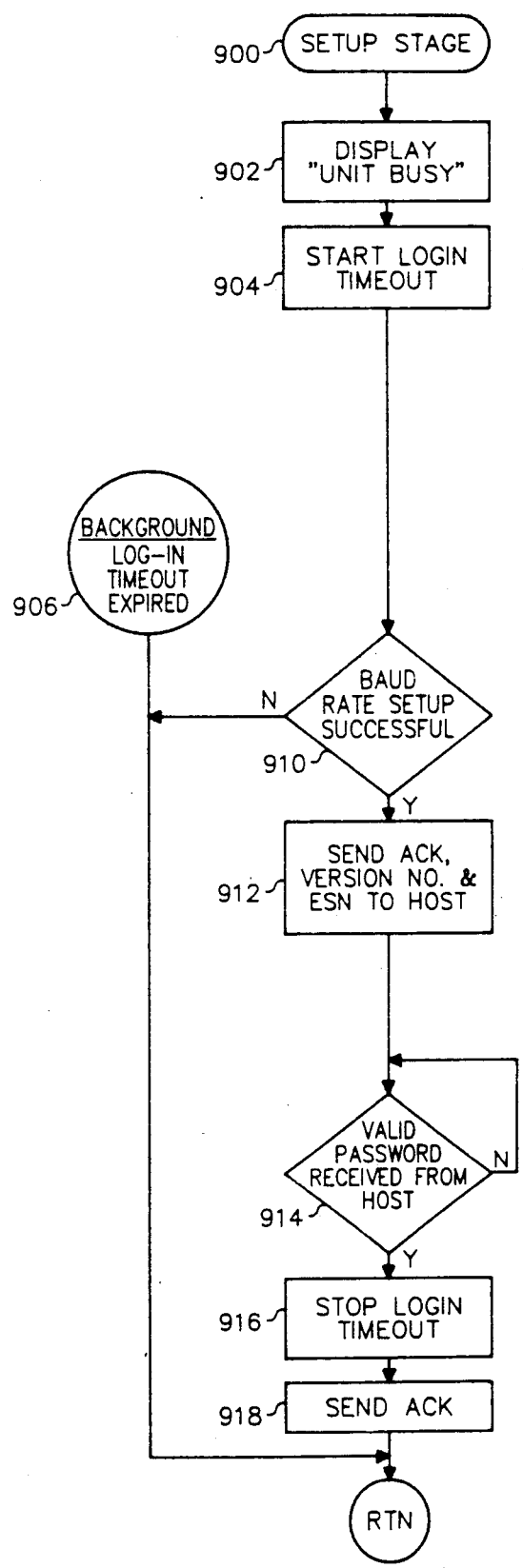
FIG. 9 shows a flowchart of a setup stage utilized by the RACT portion of the present invention.

FIG. 9 shows a flowchart of setup stage process 900, discussed above in connection with FIG. 8. Process 900 provides a security structure to prevent unauthorized access to operational data contained within RACT 22. Accordingly, process 900 defines a security procedure so that the chances of any device, other than host 10, gaining access to operational data are extremely remote. A task 902 causes the "UNIT BUSY" message to be displayed at display 56 (see FIGS. 2A and 3A), if it has not been previously displayed.

Next, a task 904 starts a login timeout timer. As discussed above in connection with task 404 (see FIG. 4), a timeout timer operates in the background mode as an alarm clock. In the preferred embodiment, task 904 sets a timeout duration on the order of 5-15 seconds. If this duration expires before the login timeout timer is disabled, program flow returns from the background mode at node 906. From node 906, program flow returns to process 800, which called this process 900. In such a situation process 900 declares the setup stage to have been unsuccessful. Process 900 refrains from disabling the login timeout timer until the login procedure can be considered successfully completed. Hence, host 10 has 5-15 seconds in which to successfully login to RACT 22. As discussed above, if the login procedure is unsuccessful, RACT 22 releases the call.

After task 904, a query task 910 is performed to determine if modem 86 can be controlled to successfully establish a baud rate for data communication with host 10. In the preferred embodiment, the call-originating party, either host 10 or RACT 22, initially supplies a predetermined number, preferably around 10, of predetermined characters, preferably all ASCII "control-Ps", at 1,200 baud. The answering party attempts to receive this predetermined string of characters at 1,200 then 300 baud. If it successfully receives such characters, it has successfully established the baud rate and returns a predetermined acknowledgement character to the originating party. If the originating party does not receive the predetermined acknowledgement character, it repeats its transmission at 300 baud, again looking for the predetermined acknowledgement character. If the baud rate setup procedure is unsuccessful, program flow in RACT 22 exits from process 900, declaring the setup stage unsuccessful.

On the other hand, when the baud rate setup procedure is successful, a task 912 returns an acknowledgement (ACK) message to host 10. This ACK message includes data which describes a software version number associated with programming in RACT 22 and the ESN of RACT 22. The present invention contemplates that different client RACTs 22 of host 10 will have different versions of software programmed therein. Such different software may utilize different command structures. Consequently, by informing host 10 of its software version number, a RACT 22 allows host 10 to know which command structure to use in communicating with it.

When host 10 receives the ACK message from RACT 22, it calculates or otherwise obtains a password using the ESN of RACT 22. The password is preferably many (8-64) bytes long so that the probability of an unauthorized device accidentally or randomly supplying a correct password is extremely remote. Preferably, host 10 associates a unique security key with the ESN, and this password is calculated using the security key and the ESN as inputs. The precise algorithm used to calculate the password is not an important feature of the present invention, and any algorithm for generating one number based on two input numbers will suffice so long as the algorithm is difficult to decipher given a key, ESN, and/or password. Once host 10 obtains the password, it transmits the password to RACT 22 using a login command message.

After task 912, a RACT 22 performs a query task 914, which examines whether an acceptable password has been supplied to RACT 22 by host 10. Preferably, RACT 22 stores its security key in its memory 82. Thus, in task 914 RACT 22 obtains its security key and performs a password-calculating algorithm similar to the one performed by host 10 to obtain the password. Since the password is not stored in memories 80-82 (see FIGS. 2B and 3B), it is difficult to detect by simply examining data contained in memories 80-82. Moreover, users of RACT 22 are not aware of either the security key or password associated with his or her RACT 22. And, since the security key is stored in memory 82, it may be changed by host 10 at any time to refresh security.

So long as task 914 fails to recognize a password supplied to it from host 10, program control remains at task 914. If a recognizable password is not detected at RACT 22 before the login timeout timer expires, the program flow exits, or returns from, process 900, declaring the setup procedure unsuccessful. Process 900 proceeds to a task 916 only if an acceptable password is received by RACT 22 prior to expiration of the login timeout timer. Task 916 stops the timeout timer so that the setup procedure will not be characterized as being unsuccessful. Next, a task 918 returns an ACK message to host 10. Host 10 interprets this ACK message as meaning that RACT 22 has successfully accepted a password previously sent to RACT 22 from host 10 and that RACT 22 has granted access to data programmed therein. After task 918, program flow exits process 900, declaring the setup procedure a success.

If host 10 fails to receive the ACK message sent by RACT 22 in task 918 within a predetermined period of time, which is less than the 5-15 seconds discussed above in connection with task 904, then host 10 may attempt to send an initializing password. The initializing password is that password which results from using an unprogrammed security key. Preferably, this unprogrammed security key has the value which results from erasing non-volatile, read-write memory 82 (see FIGS. 2B and 3B) in RACT 22. Such erasing may result from erasing EEPROM or from removing then re-applying backup power from a battery backed-up RAM. Moreover, this unprogrammed security key is the one stored in RACT 22 when RACT 22 is first placed in service. Thus, host 10 may access RACT 22 using this initializing password when RACT 22 is initially placed in service and when memory 82 is accidentally erased. Preferably, host 10 programs a new security key in RACT 22 whenever host 10 is granted access to RACT 22 using the initializing password.

Figure 10:
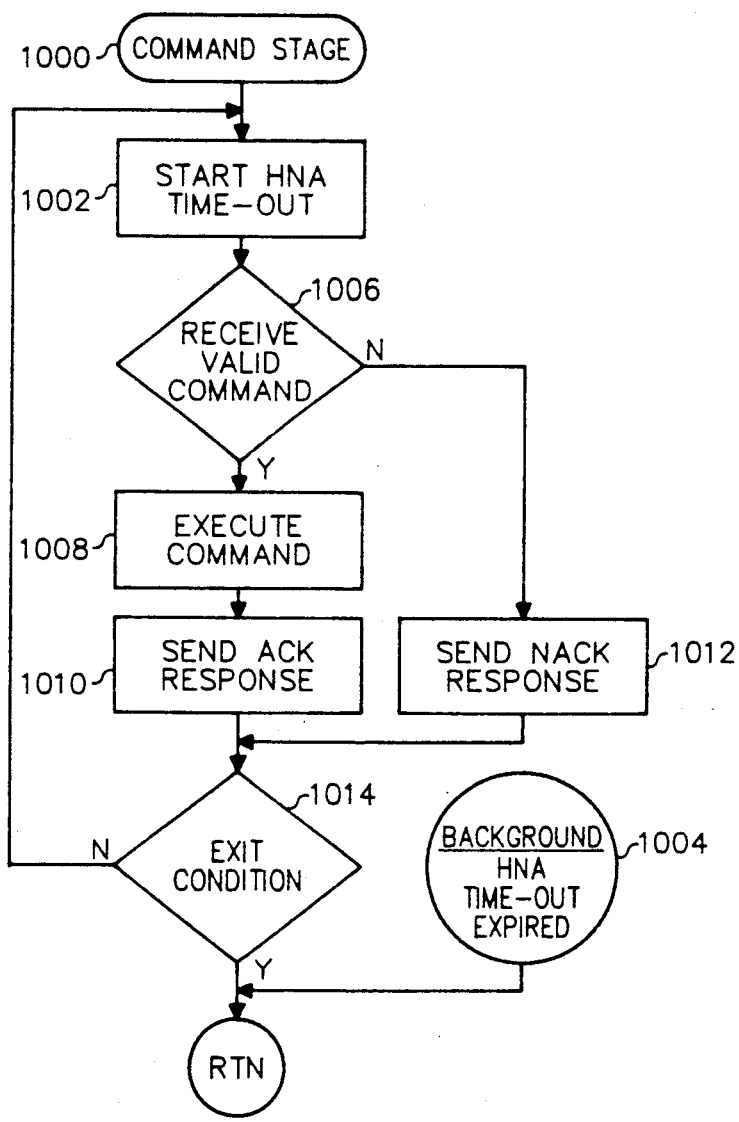
FIG. 10 shows a flowchart of a command stage utilized by the RACT portion of the present invention.

FIG. 10 shows a flowchart of command stage process 1000, discussed above in connection with FIG. 8. Process 1000 generally allows host 10 to access and manipulate data stored within RACT 22. Upon entry into process 1000, a task 1002 starts a host no action (HNA) timeout timer. Preferably, the HNA timeout timer is set to around 10 seconds. If the 10 second interval expires before the HNA timeout timer is disabled or reset, program flow returns from the background mode at node 1004. From node 1004, program flow returns to process 800, which called process 1000. In such a situation, process 1000 declares the command stage to have been unsuccessful.

Process 1000 forms a loop which performs a single iteration for each low level or primitive command issued by host 10. Process 1000 resets the HNA timeout timer every time it encounters task 1002. Hence, host 10 has 10 seconds in which to successfully issue a command to RACT 22 and to have RACT 22 act upon the command. If host 10 encounters an idle period, it may, for example, issue harmless commands, such as Read commands, to RACT 22 at 5 second intervals to keep the HNA timeout timer from expiring. As discussed above, if the command stage exits unsuccessfully, RACT 22 automatically ends the remote programming session and releases the call.

After task 1002, a query task 1006 determines whether a valid command has been received from host 10. The commands are transferred from host 10 to RACT 22 through a predetermined data communication message. Such messages preferably include error checking codes, such as a longitudinal redundancy check, which task 1006 examines to determine if a valid command has been received. In addition, RACT 22 recognizes only a few predetermined codes as being valid commands. A command code must match one of the few predetermined codes in order for task 1006 to consider the command a valid one. Moreover, each message includes several bytes of data, and the message type and data indicate the precise number of bytes which RACT 22 should receive. In the preferred embodiment, RACT 22 must receive the indicated number of bytes within a predetermined period of time before a command may be considered valid.

If task 1006 concludes that a valid command has been received, then a task 1008 executes the command. Table I, presented below, lists exemplary commands which host 10 may issue to RACT 22 and a description of the action taken by RACT 22 in response to receipt of the commands.

TABLE I

EXEMPLARY HOST COMMANDS

| Command | Description |
| --- | --- |
| LOGIN | Start remote programming. Host 10 sends a password to RACT 22 with the LOGIN command. RACT 22 grants access to RACT data if an acceptable password is received. |
| READ BYTES | RACT 22 transfers a specified number of bytes from a specified RACT memory address to host 10. Host 10 specifies the number of bytes and memory address in its command to RACT 22. |
| WRITE BYTES | Host 10 transfers a specified number of bytes to RACT 22 for storage in the memory of RACT 22 at a specified address. Host 10 specifies the number of bytes and memory address in its command to RACT 22. |
| EXECUTE FUNCTION | Host 10 specifies a Function Code in its command to RACT 22. The Function Code uniquely identifies one of many predefined functions. RACT 22 executes the specified function. |
| END SESSION | RACT 22 will successfully terminate the remote programming session. |
| IDENTIFY | RACT 22 transfers its ESN, SID, MID, and NAM checksum to the host 10. |

Table II, presented below, further defines the general types of functions recognized by RACT 22 in the Execute Function command. These functions utilize registers to transfer additional data between host 10 and RACT 10. These registers are dedicated memory locations within memory 78 (see FIGS. 2B and 3B) which host 10 may access using the Read Bytes and Write Bytes commands, discussed above in Table I.

TABLE II

EXEMPLARY RACT FUNCTIONS

| Function | Description |
| --- | --- |
| Copy Memory | RACT 22 copies data from its memory at the address pointed to by a first register. This data is copied to RACT 22 memory at the address pointed to by a second register. A third register specifies the number of bytes to be copied. |
| Generate Checksum | RACT 22 calculates the checksum of a portion of its memory space. The start of this memory space is pointed to by a first register, and the end of this memory space is pointed to by a second register. The checksum results are written into a third register. |
| Run Memory Test | RACT 22 performs a previously programmed memory test, and the results are stored in a register. |
| Reset | Programmable memory locations within RACT 22 are reset to their default values. |
| Display Message | RACT 22 displays an ASCII-coded message located in a predetermined buffer in the memory space of RACT 22. |
| Clear Display | RACT 22 clears its display. |
| Read Switch | Upon entry, a software switch number is specified in a first register and a NAM number is specified in a second register. Upon exit, RACT 22 indicates the state of the specified switch in a third register. |
| Set Switch | RACT 22 sets the software switch specified by the switch number in a first register and the NAM number in a second register. |
| Reset Switch | RACT 22 resets the software switch specified by the switch number in a first register and by the NAM number in a second register. |
| Select Feature Group | RACT 22 sets and resets groups of switches specified by the "Feature Group Indicator" number contained in a first register and the NAM number specified in a second register in accordance |

TABLE II-continued
EXEMPLARY RACT FUNCTIONS

| Function | Description |
| --- | --- |
| | with predefined patterns. |

After task 1008, a task 1010 returns an ACK message to host 10. Similarly, if task 1006 determines that a valid command has not been received at RACT 22, a no acknowledge (NACK) message is returned to host 10 in a task 1012. Table III, presented below, summarizes exemplary messages which RACT 22 may return to host 10.

TABLE III
EXEMPLARY RACT RESPONSES

| Response | Description |
| --- | --- |
| ACK | RACT 22 acknowledges the receipt of a valid command from host 10. ACK may include data in response to the setup mode, a Read command, or an Identify command. |
| NACK | RACT 22 does not recognize the receipt of a valid command from host 10. NACK may include data which specify a particular type of error. |

Upon completion of either of tasks 1010 or 1012, a query task 1014 tests whether an exit condition exists. The preferred embodiment recognizes only one valid exit condition. That condition occurs when RACT 22 receives a valid End Session command, discussed above in Table I. When this condition occurs, task 1014 disables the HNA timeout timer, and program flow exits process 1000, declaring the command stage as having been a success. When task 1014 does not detect this condition, program flow returns to task 1002, where the HNA timeout timer is reset, and process 1000 anticipates the receipt of another command from host 10.

Figure 11:
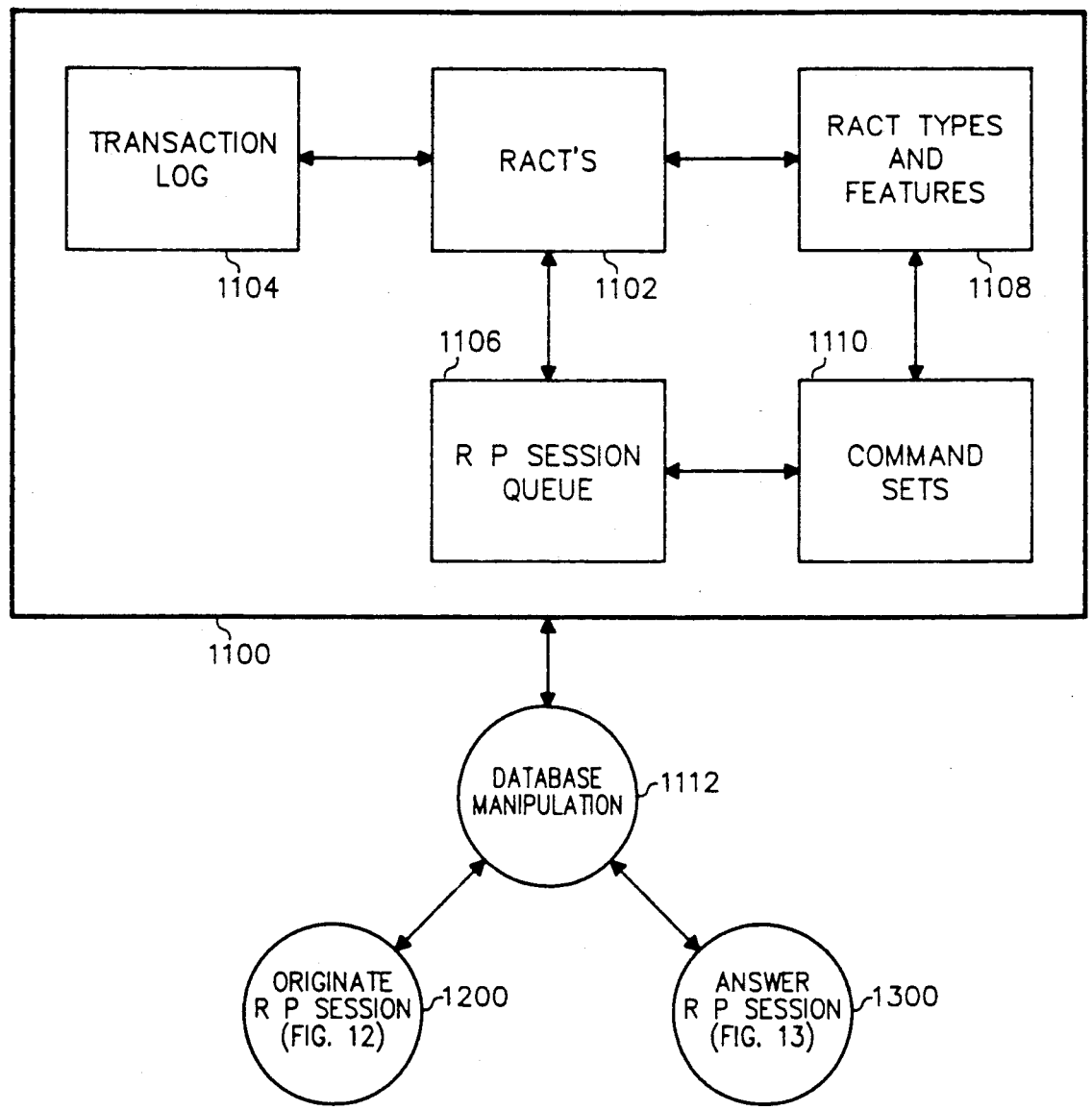
FIG. 11 shows a block diagram of a database utilized by the administration system portion of the present invention.
Figure 12:
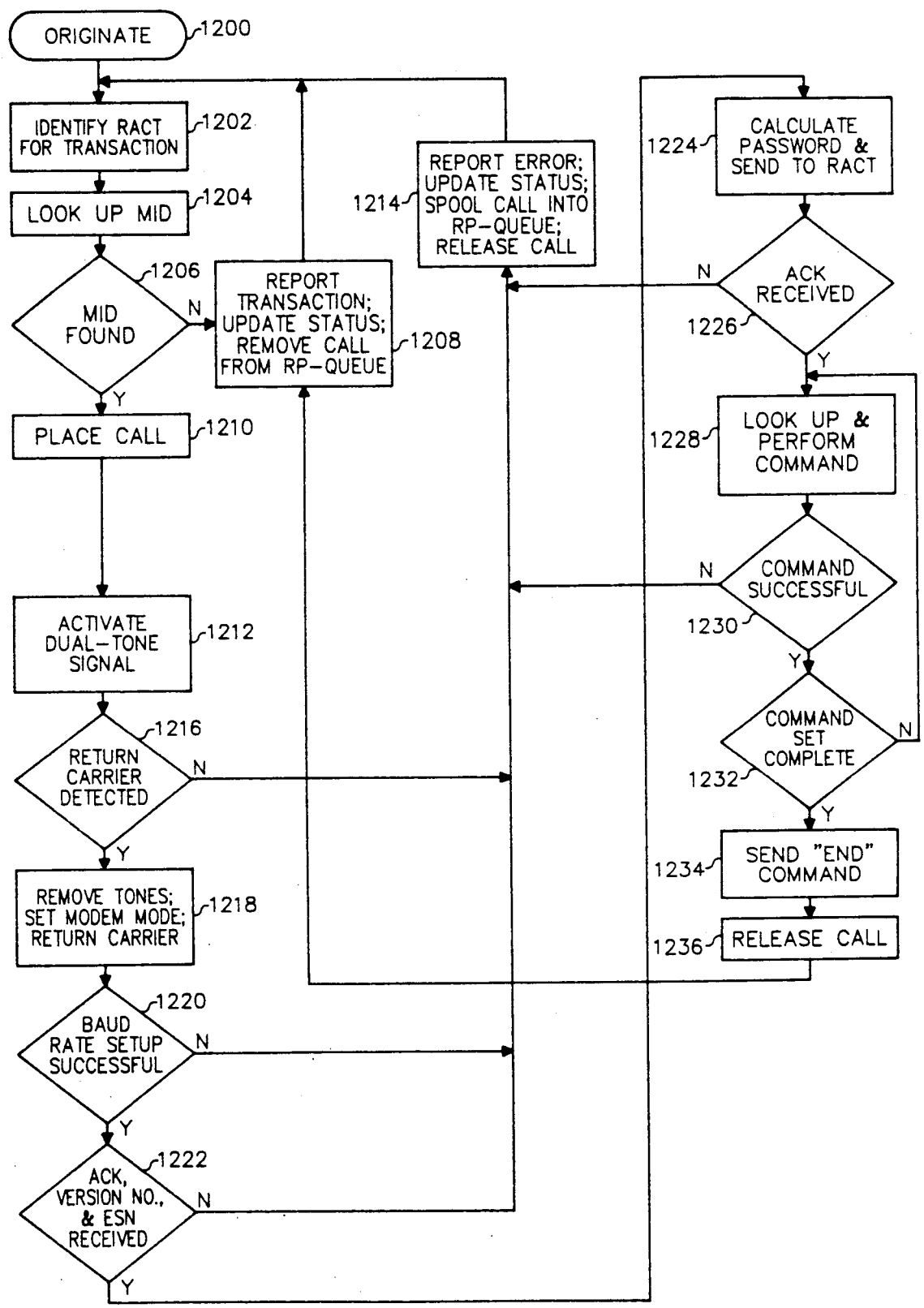
FIG. 12 shows a flowchart of an originate process utilized by the administration system portion of the present invention.
Figure 13:
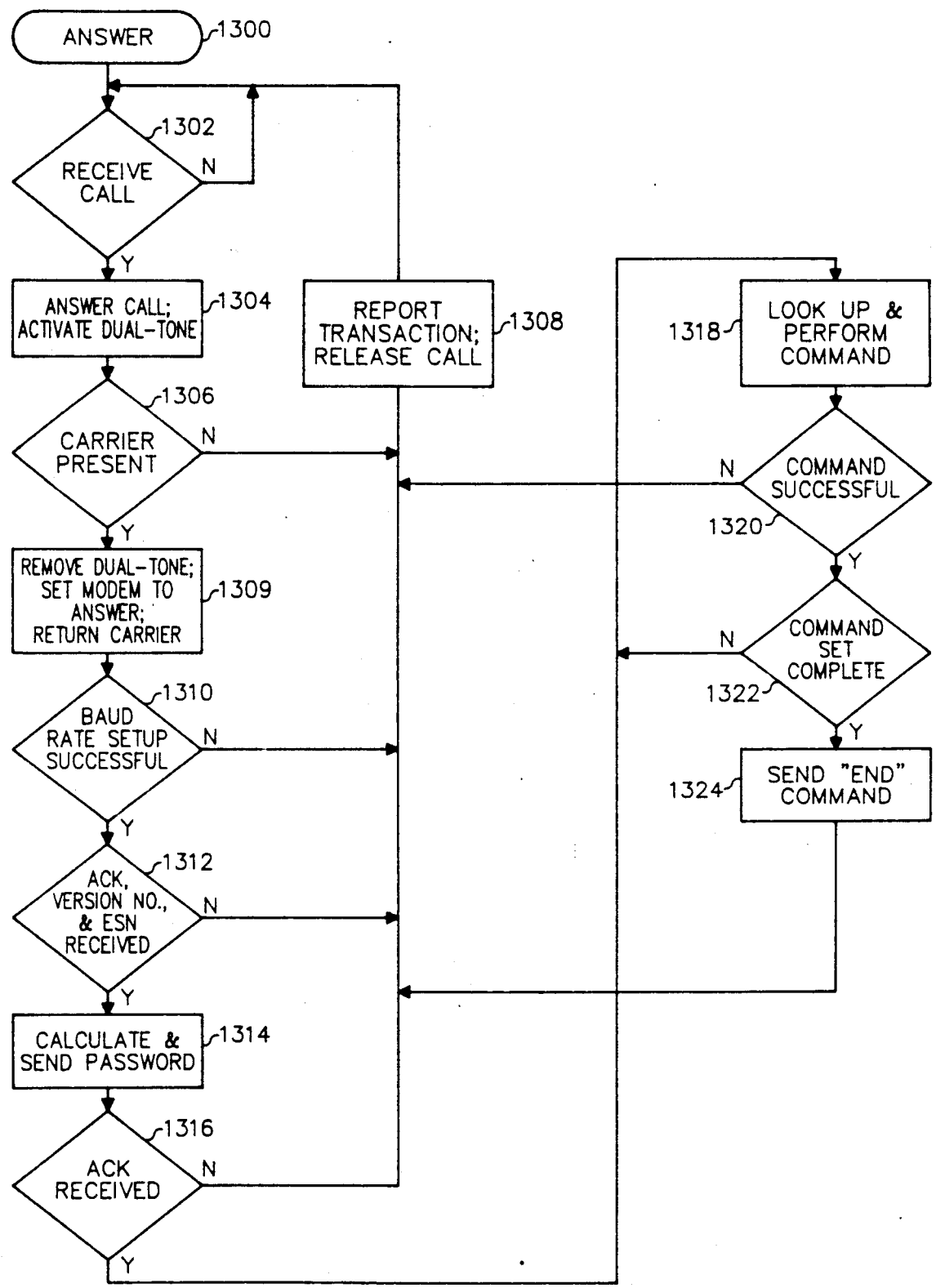
FIG. 13 shows a flowchart of an answer process utilized by the administration system portion of the present invention.

FIGS. 11-13 illustrate features of host 10. FIG. 11 presents a block diagram of the structure of a database 1100 maintained by the present invention. Database 1100 includes several data tables which are related to one another through common data fields included within the tables' records. A RACT table 1102 is centrally positioned within the structure of database 1100. Table 1102 includes a data record for each client RACT 22 supported by host 10. A transaction log table 1104 includes a data record for each remote programming (RP) session transaction attempted or completed by host 10 and RACTs 22. Transaction log table 1104 is linked to data available in RACT table 1102 through ESN data fields in records for each table. A RP-queue table 1106 includes a data record for each RP session ordered by host 10. RP-queue table 1106 is also linked to data available in RACT table 1102 and transaction log table 1104 through ESN data fields in records for each table.

A RACT types and features table 1108 includes a data record for each type of RACT 22 supported by host 10. Such types may differ by manufacturer, model number, software version, and feature packages available. Model number, software version number, and feature package identification number data fields link RACT types and features table 1108 to RACT table 1102.

A command set table 1110 includes a record for each command set utilized by host 10 in accessing data within a RACT 22. A command set data field links command set table 1110 and RP-queue table 1106 together. Hence, RP-queue table 1106 generally includes a higher level command. By linking this higher level command to command set table 1110, host 10 looks up lower level strings of commands, or remote programming interface (RPI) transaction definitions, which make up the high level command. In addition, command set table 1110 substitutes specific command primitives into the RPI transaction definitions for direct transmission to a RACT 22. Table 1110 additionally links to RACT types and features table 1108 through model and version number data fields. Accordingly, through this link primitive command definitions, NAM numbers, and memory address locations are obtained for a particular RACT 22 with which host 10 may be communicating.

Table IV, presented below, summarizes the above-discussed and other exemplary data fields included in each record of the tables of database 1100.

TABLE IV
EXEMPLARY DATA FIELDS WITHIN DATABASE 1100

RACT Table 1102—each client's record contains:
  Electronic Serial Number (ESN)
  Phone Number (MID)
  Customer Number
  Customer Name and Address
  Mobile Switch Identification (MTSO Id. & SID)
  RACT Model Number
  RACT Software Version Number
  Automated remote programming session timing data
  RACT Key
  RACT Feature Set Identification Number
  RACT NAM Checksum
Transaction Log Table 1104—each record contains:
  Date and Time Stamp
  ESN
  Remedial Action
  Remedial Status
  Command Set
RP-Queue Table 1106—each record contains:
  Date and Time Stamp
  ESN
  Priority Definition
  MID
  Command Set
RACT Types & Features Table 1108—each record contains:
  Feature Sets
  Manufacturer ID
  Manufacturer Model No.
  Software Version Numbers
  Maximum Number of NAM's
  RPI Transactions
  RPI Addresses
Command Set Table 1110 -- each record contains:
  Command Set
  RPI Transactions
  Command Primitives With reference to the data elements in table 1102, listed above in Table IV, the ESN provides a unique identifying number for each RACT 22. The MID data field allows host 10 to know the phone number of each client RACT 22. The automated remote programming session timing data represents the call-in timing data and wake-up window data discussed above in connection with tasks 504 and 512-518 (see FIG. 5). The RACT security key represents the unique security key that host 10 uses in calculating a password with which it can login to the RACT 22 identified by its ESN, as discussed above in connection with task 914 (see FIG. 9). The feature set identification number provides host 10 with a definition of the specific programmable optional features to which the owner of a RACT 22 has subscribed, and the NAM checksum provides a simple overall indication of the programming within a RACT 22.

With reference to the data elements in table 1104, listed above in Table IV, each element is provided to inform an operator of host 10 of transactions attempted and completed by host 10. The date and time stamp, which can be obtained by central processor 24 from clock 28 (see FIG. 1A), indicates when a transaction occurred. The remedial action and status data fields provide information concerning the success of a transaction, the type of problem encountered if the transaction was not a success, and what remedial action was ordered if the transaction was not a success. The command set data field gives the operator information concerning the type of transaction attempted or completed. Of course, the ESN data field provides a link to all data contained in the corresponding record of RACT table 1102.

With reference to the data fields in table 1106, listed above in Table IV, data from these fields collectively form an order for a remote programming session with a specific RACT. The date and time stamp, along with the priority definition, inform host 10 when and in what order the records in RP-queue table 1106 are to be processed. The ESN provides a link to all data contained in the corresponding record of RACT table 1102. Such data include the MID of the identified RACT 22. The command set data defines the particular type of transaction which is being ordered. As discussed above, the command set data is preferably a high level command. For example, high level commands may communicate information at the level of: "activate customer," "update customer software," "modify customer features," or "verify customer status" commands. Such high level commands are translated into appropriate strings of command primitives which are recognizable to a RACT 22 through links to command set table 1110 and from command set table 1110 to RACT types and features table 1108.

As shown in FIG. 11, host 10 communicates with and manipulates database 1100 through the performance of a database manipulation process 1112. Process 1112 is supplied through conventional database software. Any one of many commercially available database software systems may be adapted for use by process 1112. Thus, specific details concerning the precise operation of process 1112 are not important to the present invention and need not be included herein. However, as is conventional in the art of database software, process 1112 manages data transfers between tables 1102-1110, terminals and printers, and remote computers to the extent that database 1100 operates in a distributed processing environment. Data stored in database 1100 may originate from terminals, other remote entry devices, a customer activation system, other databases utilized by a cellular service provider, and the like. An exemplary customer activation system which may supply data or even form a part of database 1100 is described in "Customer Activation System" by T. Parker, U.S. Patent Application Ser. No. 265,183, filed on Oct. 31, 1988, which is incorporated herein by reference.

In addition, process 1112 transfers data to and from an originate remote programming (RP) session process 1200 and an answer RP session process 1300. Host 10 performs process 1200 in response to the records contained in RP-queue table 1106. Process 1200 is discussed below in connection with FIG. 12. Host 10 performs process 1300 to handle the receipt of incoming calls, which may originate from RACTs 22. Process 1300 is discussed below in connection with FIG. 13. Generally speaking, processes 1200 and 1300 are configured to complement within host 10 the procedures discussed above in connection with FIGS. 6-10 for a RACT 22. In addition, processes 1200 and 1300 recursively manage processes 1200 and 1300 for all modems 34 in modem bank 36 (see FIG. 1A).

As shown at a task 1202 in FIG. 12, process 1200 identifies a specific RACT 22 with which to engage in an RP session. An operator of host 10 may utilize database software 1112 (see FIG. 11) to activate any number of records in RP-queue table 1106. Either individual RACTs 22 may be selected for RP sessions by searching for specific RACT records in table 1102, or multiple RACTs 22 may be selected for en masse RP sessions by sorting table 1102 by any desired data field to select a group of RACTs 22. Such records' timing and priority data are included, as discussed above. Task 1202 monitors this timing and priority data to select a single record, and the selected record identifies a RACT 22 for an RP session. Any of the many types of prioritization schemes known to those skilled in the art are acceptable for use in connection with task 1202. If no records are available for instant processing, program flow may remain within task 1202 until such records become available.

After task 1202 selects a single RACT 22, a task 1204 attempts to look up the MID associated with the selected RACT 22. As discussed above, the selected record from RP-queue table 1106 includes an ESN field, and this ESN field links to table 1102 to select a record having the same ESN. That selected record may contain an MID which task 1204 obtains. Next, a query task 1206 determines whether an MID was found. If an MID was not found, a task 1208 makes an entry in transaction log table 1104 and removes the RP session order from RP-queue table 1106. The entry task 1208 makes in table 1104 identifies the problem encountered, which in this situation is a missing MID. An operator of host 10 can later review this entry and take corrective action.

On the other hand, if tasks 1204-1206 successfully find a MID, a task 1210 places a call to this MID by causing a modem 34 from modem bank 36 (see FIG. 1A) to dial the MID. Next, a task 1212 activates the dual-tone signal, discussed above in connection with FIGS. 1A and 2A. Controller 32 activates the dual-tone signal by manipulating the appropriate control bit of control bus 46 (see FIG. 1A). After task 1212, a query task 1216 investigates whether a return data communication carrier signal is detected. This determination is made by monitoring a carrier detect control signal from the selected one of modems 34 within modem bank 36.

If the predetermined period of time transpires without the call being answered or for another problem which results in no carrier detect signal being detected at task 1216, a task 1214 makes an entry in transaction log table 1104 and revises the RP session record within RP-queue table 1106. This revision may advantageously change the timing and priority data included in the selected record from RP-queue table 1106. Normally, the change will schedule another RP session for a later time. However, the present invention contemplates any one of a wide variety of algorithms which may be used to reschedule a call. The entry in transaction log table 1104 additionally reports the status of the scheduled RP session, which in this case is an unanswered call, and the type of remedial action taken by task 1214, which would normally be a later-rescheduled RP session. After task 1214, program flow returns to task 1202 to obtain the next record.

When task 1216 detects the timely return of a data communication carrier signal, a task 1218 removes the dual-tone signal and sets the selected one of modems 34 to the originate mode. The called RACT 22 then detects a data communication carrier signal.

After task 1218, a query task 1220 attempts to setup a baud rate for data communication between host 10 and RACT 22. The baud rate setup procedure is the same as that described above in connection with task 910 (see FIG. 9). If the baud rate setup procedure is not successful, process 1200 performs task 1214, which makes a transaction record and revises the RP session queue, as discussed above.

On the other hand, when the baud rate has been successfully setup, a query task 1222 waits for the receipt of a valid ACK message from RACT 22. As discussed above in connection with task 912 (see FIG. 9) this ACK message contains a software version number and ESN for that RACT 22. If the ACK message is not received within a predetermined period of time, process 1200 performs task 1214, which makes a transaction record and revises the RP session queue, as discussed above.

Upon receipt of an ACK message from RACT 22, a task 1224 calculates the password for this RACT 22 and sends it to the RACT 22. As discussed above, the ESN for this RACT 22 is used with the RACT key data element in RACT table 1102 to generate the password. The generation of RACT key data elements in host 10 is not a critical feature of the present invention, and may occur through the generation of random or pseudo-random numbers. Next, in a query task 1226, process 1200 waits for the RACT 22 to return an ACK message. If the ACK message is not returned within a predetermined period of time, task 1226 may advantageously attempt to gain access to the RACT 22 using the initializing password, discussed above in connection with task 914 (see FIG. 9). However, if RACT 22 again fails to return an ACK message, process 1200 performs task 1214, which makes a transaction record and revises the RP session queue, as discussed above.

After task 1226 detects the returned ACK message from RACT 22, host 10 has gained access to data within RACT 22 and may enter its command mode. Accordingly, a task 1228 looks up the appropriate command primitives, as discussed above, and performs the command. The commands are discussed above in connection with Tables I-II. The performance of the command may require the sending of data to RACT 22, as in a Write bytes command.

Next, process 1200 performs a query command 1230, which determines whether the command issued above in task 1228 was successfully performed by RACT 22. Task 1230 monitors incoming messages from RACT 22 in making this determination. An ACK message indicates successful completion of a command while no message or a NACK message indicates an unsuccessfully completed command (see Table III). If a NACK message is received, task 1230 may attempt to resend the command for a predetermined number of tries. However, if task 1230 continually fails to receive an ACK message, program flow transfers to task 1214, which makes a transaction record and revises the RP session queue, as discussed above. As discussed above in Table III, NACK messages may include an indication of the problem encountered by RACT 22 in receiving a valid command. Such indications may be included in the status report made in the transaction record.

When task 1230 detects the receipt of an ACK message, a query task 1232 tests to see if the command set has been completed. In other words, task 1232 determines if host 10 has completed all operations it needs to conduct with RACT 22. If the command set is not yet completed, program flow loops back to task 1228, which causes another command to be issued to RACT 22. This looping process continues until all commands have been performed.

When the command set has been completed, a task 1234 sends the End Session command, discussed above in connection with Table I and with task 1014 (see FIG. 10). Next, a task 1236 releases the call, and program flow proceeds to task 1208, discussed above, which makes a transaction record for a successfully completed RP session and removes the call from the RP-queue. Process 1200 then loops back through tasks 1202-1236 so long as RP-queue table 1106 contains records to be processed.

As shown at a query task 1302 in FIG. 13, process 1300 monitors modem bank 36 (see FIG. 1A) to determine if an incoming call is being received. Process 1300 remains in task 1302 so long as no calls are being received. When task 1302 detects an incoming call, a task 1304 answers the call, and sends the dual-tone signal. Next, a query task 1306 determines whether a data communication carrier is returned to host 10. If, after a predetermined period, task 1306 fails to discover a returned data communication carrier, process 1300 transfers to a task 1308. Task 1308 makes a transaction report, in a manner similar to that discussed above in connection with tasks 1208 and 1214, and releases the call. After task 1308, process 1300 returns to task 1302 to await another incoming call.

When task 1306 detects a data communication carrier, a task 1309 controls a selected one of modems 34 (see FIG. 1A) to operate in its answer mode. The selected modem 34 then returns a data communication carrier to the calling party. After task 1309, a query task 1310 attempts to setup a baud rate for data communication between host 10 and RACT 22. The baud rate setup procedure is the same as that described above in connection with task 910 (see FIG. 9) and task 1220 (see FIG. 12). If the baud rate setup procedure is not successful, process 1300 performs task 1308, which makes a transaction record, as discussed above.

On the other hand, when the baud rate has been successfully setup, a query task 1312 waits for the receipt of a valid ACK message from RACT 22. Task 1312 operates substantially as described above in connection with task 1222 (see FIG. 12). If the ACK message is not received within a predetermined period of time, process 1300 performs task 1308, which makes a transaction record, as discussed above. Upon receipt of an ACK message, which includes an ESN, a task 1314 uses the ESN to look up a RACT key in table 1102 (see FIG. 11). In addition, task 1314 uses the RACT key and ESN to calculate a password, as discussed above in connection with task 914 (see FIG. 9), and sends the password to the RACT 22.

Next, in a query task 1316, process 1300 waits for RACT 22 to return an ACK message. If the ACK message is not returned within a predetermined period of time, task 1316 may again attempt to gain access to RACT 22 using the initializing password discussed above. However, if RACT 22 again fails to return an ACK message, process 1300 performs task 1308, which makes a transaction record, as discussed above.

After task 1316 detects the returned ACK message from RACT 22, it has gained access to data within RACT 22 and may enter the command mode. Accordingly, a task 1318 looks up the appropriate command primitives, as discussed above, and performs the command. Next, process 1300 performs a query task 1320, which determines whether the command issued above in task 1318 was successfully performed by RACT 22. Task 1320 operates substantially as discussed above in connection with task 1230 (see FIG. 12). If task 1320 continually fails to receive an ACK message from RACT 22, program flow transfers to task 1308, which makes a transaction record, as discussed above.

When task 1320 detects the receipt of an ACK message, a query task 1322 tests to see if the command set has been completed. If the command set is not yet complete, program flow loops back to task 1318, which causes another command to be issued to RACT 22. This looping process continues until all commands have been performed.

When the command set has been completed, a task 1324 sends the End Session command, discussed above in connection with Table I and task 1014 (see FIG. 10). After task 1324, program flow proceeds to task 1308, discussed above, which now makes a transaction record for a successfully completed RP session. Process 1300 then loops back through tasks 1302-1324 to process additional incoming calls.

The Identify command, see Table I above, is one command expected to be commonly performed during process 1300. As discussed above in Table I, the Identify command causes a RACT 22 to return its ESN, SID, MID, and NAM checksum. This returned information is sufficient to uniquely identify the RACT 22 and to determine whether its features have been altered from those present when its record within RACT table 1102 (see FIG. 11) was last updated. A look up operation within table 1102 provides the information against which data received from RACT 22 in response to the identify command is compared. If the operational data has not changed, then host 10 may advantageously synchronize the date and time clock of RACT 22 to its own by issuing an appropriate Write bytes command. After synchronizing the date and time clock, host 10 may advantageously issue an End Session Command. Accordingly, the Identify command definition and communication scheme is specifically designed to minimize the amount of cellular air-time required to maintain database 1100 (see FIG. 11) in a current state.

In summary, the present invention provides an improved cellular telephone that supports remote programming. Those skilled in the art will recognize that once RACT 22 grants access to its data, host 10 may perform any number of operations. Virtually any significant item of operational data may be altered by host 10. This would include the downloading of new cellular telephone programming.

Each RACT has predefined memory locations which it utilizes for various functions. The specific locations and functions are not important in the present invention. However, host 10 may alter such memory locations to achieve a desirably altered functionality. For example, SID numbers which a RACT avoids in roaming situations (i.e. negative SIDs) may be altered to reflect newly negotiated roaming contracts between a local cellular service provider and remote cellular service providers. Likewise, customer activation and feature upgrades may be remotely accomplished by host 10 without requiring physical access to a RACT 22. Furthermore, customer service technicians may remotely perform low level diagnostics through host 10. Still further, periodic status inquiries permit host 10 to maintain current and accurate information in its database. Such current information aids marketing efforts and the policing of unauthorized RACT programming.

The present invention may be configured either as a remotely accessible cellular telephone or as a kit which cooperates with a conventional cellular telephone to provide a remote accessibility feature. The present invention provides an improved method for operating a cellular telephone so that it accommodates remote accessibility without interfering with conventional cellular telephone operating procedures. The present invention includes a security structure to severely hinder unauthorized tampering with remotely accessible cellular telephones, and the present invention includes automated call-in and answering procedures which minimize interference with a customer's usage of the cellular telephone and with the capacity resources of the public cellular system. In addition, the present invention provides a system and method for remotely managing a multiplicity of such remotely accessible cellular telephones. The managing system and method permit either individual or en masse access to client telephones.

The present invention has been described above with reference to preferred embodiments. However, those skilled in the art will recognize that changes and modifications may be made in these preferred embodiments without departing from the scope of the present invention. For example, those skilled in the art will recognize that the flowcharts presented herein have been simplified to teach the present invention. The various procedures, methods, tasks, and processes of the present invention may cooperate with one another in the indicated manner or in alternate forms which accomplish similar tasks. In addition, the database structure described herein may be modified to include different table relationships or different and additional data elements therein. Moreover, the present invention contemplates that a wide variety of specific jobs are to be performed using the present invention. For this reason, the present invention represents a flexible system which operators may program to perform such jobs. These and other changes and modifications which are obvious to those skilled in the art are intended to be included within the scope of the present invention.

What is claimed is:

1. A remotely accessible cellular telephone (RACT) having operational data stored therein, said RACT comprising:

an erasable, non-volatile memory for storing said operational data;

processing means coupled to said memory and being programmed to manipulate said operational data;

an audio bus for the transmission of audio frequency signals;

a modem having an audio port coupled to said audio bus and a data port coupled to said processing means, said modem being operable to communicate data between said processing means and said audio bus; and signal detection means, having an input coupled to said audio bus and an output coupled to said processing means, for detecting the occurrence of an audio signal having predetermined parameters.

2. A RACT as claimed in claim 1 wherein:

said modem generates and recognizes only audio frequencies included in a predetermined set of audio frequencies; and said signal detection means is configured to detect only the occurrence of an audio signal which is not within said predetermined set of audio frequencies.

3. A RACT as claimed in claim 1 wherein said signal detection means is configured to detect the occurrence of an audio signal simultaneously exhibiting at least two discrete frequencies.

4. A RACT as claimed in claim 1 additionally comprising:

an RF section, coupled to said processing means and to said audio bus, said RF section being configured to modulate and demodulate signals from and to, respectively, said audio bus for radio frequency communication;

clock means, coupled to said processing means, for maintaining current data describing a date and a time; and power control means, coupled to said processing means and to said RF section, for automatically energizing and de-energizing said RF section in response to said date and time data maintained by said clock means.

5. A RACT as claimed in claim 1 wherein said memory, processing means, modem, and signal detection means are all included within a transmit-receive unit (TRU) portion of said RACT, and said RACT additionally comprises:

a cradle portion coupled to said TRU through said audio bus and through a serial data bus; and a handset portion coupled to said cradle portion.

6. A RACT as claimed in claim 1 wherein:

said processing means, said modem, and said signal detection means are included within a remote programming unit (RPU) portion of said RACT;

said memory is included in a transmit-receive unit (TRU) portion of said RACT;

said audio bus couples to said RPU and to said TRU; and said RACT additionally comprises:

a serial data bus coupled between said processing means within said RPU and said memory means within said TRU, a cradle portion coupled to said RPU, and a handset portion coupled to said cradle portion.

7. A RACT as claimed in claim 6 wherein said RACT is installed in a vehicle having a signal for indicating the state of ignition for said vehicle, and wherein:

said RPU additionally comprises clock means, coupled to said processing means, for maintaining current data describing a date and a time;

said processing means is adapted to receive said vehicle ignition signal and to output a simulated ignition signal, said simulated ignition signal being responsive to said vehicle ignition signal and to said date and time data: and said TRU is adapted to receive said simulated ignition signal.

8. In a remotely accessible cellular telephone (RACT) which engages in data communication with an administration system, wherein said data communication utilizes only audio frequencies selected from a predetermined set of audio frequencies to effect data modulation and demodulation, a method of permitting external access to operational data programmed in said RACT, said method comprising the steps of:

detecting the occurrence of an incoming call;

answering said incoming call;

monitoring said call to detect an identifying signal, said identifying signal being absent from said predetermined set of audio frequencies; and granting said external access only if said monitoring step detects said identifying signal.

9. A method as claimed in claim 8 wherein:

said method additionally comprises the step of monitoring said call to detect the receipt of data describing a predetermined password; and said granting step grants said external access if said predetermined password data are detected.

10. A method as claimed in claim 9 wherein said RACT has a unique electronic serial number (ESN) associated therewith, and wherein:

said method additionally comprises the steps of:

obtaining data describing a security key from a memory portion of said RACT, and calculating said predetermined password data based upon said ESN and said key; and said granting step grants said external access only if said predetermined password data are detected.

11. A method as claimed in claim 10 wherein:

said RACT includes a speaker; and said method additionally includes the step of muting said speaker during said monitoring step.

12. A method as claimed in claim 8 additionally comprising the step of monitoring said call to detect the presence of a data communication carrier signal, said carrier signal being included in said predetermined set of audio frequencies.

13. A method as claimed in claim 8 additionally comprising the steps of:

initializing a timer to a predetermined duration if said monitoring step detects said identifying signal; and denying said external access if said predetermined duration expires prior to said granting step.

14. A method as claimed in claim 8 additionally comprising the step of resolving a data rate for said data communication.

15. A method of remotely communicating with a cellular telephone having operational data programmed therein, said method comprising the steps of:

storing a phone number corresponding to an administration system;

maintaining current data describing a date and a time;

storing data describing a call-in time;

comparing said current data with said call-in time to detect the occurrence of said call-in time;

automatically dialing said phone number when said comparing step detects said call-in time to establish data communication with said administration system;

allowing said administrative system to access said operational data; and modifying said data describing said call-in time in response to data communication received from said administration system.

16. A method as claimed in claim 15 wherein:

said method additionally comprises the step of monitoring said operational data to detect alteration of said operational data; and said dialing step additionally dials said phone number if said monitoring step detects alteration of said operational data.

17. A method as claimed in claim 15 additionally comprising, after said allowing step, the step of revising said stored data describing a call-in time.

18. A method as claimed in claim 15 wherein said dialing step comprises the step of determining whether said administration system answers in response to said dialing of said phone number.

19. A method as claimed in claim 15 additionally comprising the step of copying said operational data from an operational memory area into a memory buffer prior to said allowing step so that said administration system can access said operational data within and limit its operations to said memory buffer.

20. A method as claimed in claim 19 additionally comprising the steps of:

determining whether said allowing step terminated successfully; and copying said memory buffer into said operational memory area after said allowing step only if said allowing step terminated successfully.

21. A method of remotely communicating with a cellular telephone having operational data programmed therein, said method comprising the steps of:

storing a phone number corresponding to an administration system;

maintaining, separate from said operational data, identifying data which described the content of said operational data in the past;

monitoring said operational data to determine whether said identifying data describes the present content of said operational data;

automatically dialing said phone number when said monitoring step determines that said identifying data does not describe the present content of said operational data, said dialing being performed to establish data communication with said administration system; and allowing said administration system to access said operational data.

22. A method as claimed in claim 21 wherein said method additionally comprises the steps of:

maintaining current data describing a date and a time;

storing data describing a call-in time;

monitoring said current data to detect the occurrence of said call-in time; and said automatically dialing step additionally dials said phone number when said monitoring step detects said call-in time.

23. A method as claimed in claim 21 wherein said dialing step comprises the step of determining whether said administration system answers in response to said dialing of said phone number.

24. A method as claimed in claim 21 additionally comprising the step of copying said operational data from an operational memory area into a memory buffer prior to said allowing step so that said administration system can access said operational data within and limit its operations to said memory buffer.

25. A method as claimed in claim 24 additionally comprising the steps of:

determining whether said allowing step terminated successfully; and copying said memory buffer into said operational memory area after said allowing step only if said allowing step terminated successfully.

26. A method of remotely communicating with a cellular telephone having operational data programmed therein, said method comprising the steps of:

maintaining current data describing a date and a time;

storing data descriptive of a wake-up timing window;

monitoring said current data to detect the beginning of said wake-up window;

energizing an RF portion of said cellular telephone when said monitoring step detects said beginning of said wake-up window;

determining whether said cellular telephone receives a call; and if said cellular telephone receives a call from an administration system, allowing said administration system to access and modify said operational data.

27. A method as claimed in claim 26 additionally comprising the steps of:

monitoring said current data to detect the end of said wake-up window; and de-energizing said RF portion of said cellular telephone when said end of said wake-up window occurs.

28. A method as claimed in claim 26 additionally comprising the step of revising said data describing said wake-up timing window after said allowing step.

29. A method as claimed in claim 26 additionally comprising the step of copying said operational data from an operational memory area into a memory buffer prior to said allowing step so that said administration system can access said operational data within and limit its operations to said memory buffer.

30. A method as claimed in claim 29 additionally comprising the steps of:

determining whether said allowing step terminated successfully; and copying said memory buffer into said operational memory area after said allowing step only if said allowing step terminated successfully.

31. A method as claimed in claim 26 wherein:

said access to said operational data occurs through data communication between said cellular telephone and said administration system;

said data communication utilizes only audio frequencies selected from a predetermined set of audio frequencies to effect data modulation and demodulation; and said method determines that said call is received from said administration system by detecting the presence of an identifying signal, said identifying signal being absent from said predetermined set of audio frequencies.

32. A method as claimed in claim 31 wherein:

said identifying signal detecting step detects the presence of an audio signal simultaneously exhibiting a first frequency and a second frequency; and neither of said first and second frequencies are contained in said predetermined set of audio frequencies.

33. A method as claimed in claim 31 wherein said allowing step further determines that said call is received from said administration system by detecting the receipt of data describing a predetermined password.

34. A method as claimed in claim 26 wherein said cellular telephone receives a call when a ringing event occurs, and said method additionally comprises the steps of:
monitoring the duration of said ringing event; and
automatically answering said call after said ringing event persists for a predetermined minimum duration.

35. A method of operating a remotely accessible cellular telephone (RACT) having operational data, including a number assignment module (NAM), stored therein, said method comprising the steps of:
granting external access to said operational data;
receiving a data communication organized as an Identify command for said RACT; and
returning a data communication in response to said receiving step, said returned data communication including data which describe the contents of said NAM.

36. A method as claimed in claim 35 wherein said returning step is additionally configured to return a mobile identification number (MID) and a system identification number (SID) in response to said receiving step.

37. A method as claimed in claim 35 additionally comprising, after said returning step, the step of receiving a second data communication organized to communicate one of a Read Bytes, Write Bytes, and an Execute Function command to said RACT.

38. A method as claimed in claim 37 wherein:
said second data communication is organized to communicate said Read Bytes command and to include an address and a number; and
said method additionally comprises the step of returning, in response to said Read Bytes command, a data communication which includes data organized to acknowledge successful completion of said Read Bytes command and a quantity of bytes of operational data obtained from said RACT beginning at said address therein, said quantity being equivalent to said number.

39. A method as claimed in claim 37 wherein:
said second data communication is organized to communicate said Write Bytes command and to include an address and a string of data; and
said method additionally comprises the step of writing, in response to said Write Bytes command, said string of data received with said Write Bytes command in said RACT at said address.

40. A method as claimed in claim 37 wherein:
said second data communication is organized to communicate said Execute Function command and includes data instructing said RACT to take a specified action with respect to one of a RACT memory, a RACT display, and an RACT software switch; and
said method additionally comprises the step of taking said specified action.

41. A method as claimed in claim 37 wherein:
said Execute Function command instructs the taking of an action with respect to said RACT memory by forming a checksum; and
said taking step comprises the step of calculating said checksum.

42. An administration system for managing a multiplicity of client remotely accessible cellular telephones (RACTs), said system comprising:
memory means having data therein describing parameters characteristic of each of said multiplicity of client RACTs;
processing means, coupled to said memory means, for manipulating said data to remotely communicate with a selected one of said client RACTs;
a modem having a data port coupled to said processing means and having a audio port for coupling to a telephone line, said modem being configured to generate and recognize only audio frequencies from a predetermined set of audio frequencies; and
audio signal generation means having an output selectively coupled to said audio port of said modem and a control input coupled to said processing means, said audio signal generation means applying an audio identifying signal at said audio port of said modem in response to a control signal from said processing means, said audio identifying signal being excluded from said predetermined set of audio frequencies.

43. An administration system as claimed in claim 42 wherein said audio signal generation means is configured to generate an audio signal that simultaneously exhibits at least two discrete frequencies.

44. A method of managing a multiplicity of client remotely accessible cellular telephones (RACTs), said method comprising the steps of:
storing data descriptive of an electronic serial number (ESN), a mobile identification number (MID), and a key, for each of said client RACTs;
identifying one of said multiplicity of client RACTs for participation in a remote programming session;
retrieving the MID associated with said identified one of said RACTs;
placing a call to said MID;
transmitting an audio identifying signal to said identified RACT; and
transmitting, during said call, a password calculated using a security key associated with said identified one of said RACTs to gain access to operational data within said identified RACT.

45. A method as claimed in claim 44 additionally comprising, prior to said password transmitting step, the steps of:
monitoring said call to detect the receipt of a data communication carrier signal; and
halting transmission of said audio identifying signal upon detection of said carrier signal.

46. A method as claimed in claim 44 additionally comprising, after said password transmitting step, the steps of:
retrieving a command set identifier from a remote programming session queue;
looking up command primitives in a command set table using said command set identifier as an index; and
sending said command primitives to said identified RACT.

47. A method as claimed in claim 46 wherein:

said method additionally comprises the step of receiving, prior to said password transmitting step, an identifying number from said identified RACT; and said looking up step is configured to select said command primitives in response to said identifying number and said command set identifier.

48. A method as claimed in claim 44 additionally comprising, prior to said password transmitting step, the step of resolving a data rate for data communication with said identified RACT.

49. A method of managing a multiplicity of client remotely accessible cellular telephones (RACTs), said method comprising the steps of:
  storing, in a data base, data descriptive of an electronic serial number (ESN), recorded mobile identification number (MID), recorded system identification number (SID), recorded data which describe the contents of a number assignment module (NAM), and a security key for each of said RACTs;
  monitoring a phone line for an incoming call;
  answering said incoming call to initiate a remote programming session;
  receiving a data communication which supplies an ESN;
  retrieving said security key associated in said data base with said ESN supplied in said receiving step;
  transmitting a password based upon said security key retrieved in said retrieving step to gain access to operational data within one of said RACTs.

50. A method as claimed in claim 49 additionally comprising, prior to said receiving step, the step of resolving a data rate for said data communication of said receiving step.

51. A method as claimed in claim 49 wherein said operational data within said one of said RACTs includes a number assignment module (NAM), and said method additionally comprises the steps of:
  receiving current data which describe the contents of said NAM; and
  verifying that said current data which describe the contents of said NAM correspond to said recorded data which describe the contents of said NAM associated with said ESN in said storing step.

52. A method as claimed in claim 51 wherein:
  said receiving current data step is additionally configured to receive a current MID associated with said RACT in response to said transmitting step; and
  said method additionally comprises the step of verifying that said current MID corresponds to said recorded MID associated with said ESN in said storing step.

53. A method as claimed in claim 51 wherein:
  said receiving current data step is additionally configured to receive a current SID in response to said transmitting step; and
  said method additionally comprises the step of verifying that said current SID corresponds to said recorded SID associated with said ESN in said storing step.

* * * * *